United States Patent
Mondet et al.

(10) Patent No.: US 11,943,792 B2
(45) Date of Patent: Mar. 26, 2024

(54) TECHNIQUES FOR PERFORMING BANDWIDTH PART SWITCHING

(71) Applicant: QUALCOMM Incorporated, San Diego, CA (US)

(72) Inventors: Mickael Mondet, Louannec (FR); Prashanth Haridas Hande, San Diego, CA (US); Chih-Ping Li, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/397,536

(22) Filed: Aug. 9, 2021

(65) Prior Publication Data
US 2023/0038329 A1   Feb. 9, 2023

(51) Int. Cl.
*H04W 72/02* (2009.01)
*H04W 72/044* (2023.01)
*H04W 72/1268* (2023.01)
*H04W 72/50* (2023.01)

(52) U.S. Cl.
CPC ......... *H04W 72/535* (2023.01); *H04W 72/02* (2013.01); *H04W 72/044* (2013.01); *H04W 72/1268* (2013.01)

(58) Field of Classification Search
None
See application file for complete search history.

(56) References Cited

U.S. PATENT DOCUMENTS

| | | | | |
|---|---|---|---|---|
| 11,395,299 B2* | 7/2022 | Babaei | ............... | H04W 24/08 |
| 11,800,525 B2* | 10/2023 | Liu | ............... | H04W 28/08 |
| 2019/0141695 A1* | 5/2019 | Babaei | ............ | H04W 56/0045 |
| 2019/0149213 A1* | 5/2019 | Zhou | ............... | H04L 5/0048 |
| | | | | 370/329 |
| 2019/0296882 A1* | 9/2019 | Li | ............... | H04L 5/0094 |
| 2020/0195410 A1* | 6/2020 | Li | ............... | H04W 24/08 |

(Continued)

FOREIGN PATENT DOCUMENTS

| | | | | |
|---|---|---|---|---|
| CN | 110249694 A | * | 9/2019 | ............ H04L 5/001 |
| EP | 3723321 B1 | * | 8/2023 | ........... H04B 17/309 |

(Continued)

*Primary Examiner* — Kodzovi Acolatse
(74) *Attorney, Agent, or Firm* — Holland & Hart LLP/Qualcomm Incorporated

(57) ABSTRACT

Methods, systems, and devices for wireless communications are described. A user equipment (UE) may communicate with a base station via a first instance of a periodic data burst, where the periodic data burst may include one or more uplink or downlink transmissions scheduled on a first bandwidth part (BWP). The UE may start a bandwidth switching timer at the beginning of the first instance of the periodic data burst, and determine whether the bandwidth switching timer has expired upon expiration of an inactivity timer that was triggered by receipt of one or more downlink control channel messages. The UE may operate, based on the determination, on one of the first BWP or a second BWP during at least a portion of a time period that extends from the expiration of the inactivity timer and a beginning of a second instance of the periodic data burst.

30 Claims, 18 Drawing Sheets

(56) References Cited

U.S. PATENT DOCUMENTS

| | | | | |
|---|---|---|---|---|
| 2020/0374844 A1* | 11/2020 | Takeda | .............. | H04L 27/26025 |
| 2021/0105722 A1* | 4/2021 | Tsai | .................. | H04W 52/0235 |
| 2021/0167930 A1* | 6/2021 | Jeon | ...................... | H04L 5/0098 |
| 2021/0176029 A1* | 6/2021 | Tsai | ....................... | H04L 1/1614 |
| 2021/0176030 A1* | 6/2021 | Tsai | .................. | H04W 74/0833 |
| 2021/0184824 A1* | 6/2021 | Kwak | ................... | H04L 5/0094 |
| 2021/0212099 A1* | 7/2021 | Yi | ...................... | H04W 52/0216 |
| 2021/0243766 A1* | 8/2021 | Zhou | ..................... | H04W 36/06 |
| 2021/0336750 A1* | 10/2021 | Zhou | ................... | H04L 27/2607 |
| 2022/0046522 A1* | 2/2022 | Kim | ....................... | H04W 76/15 |
| 2022/0303991 A1* | 9/2022 | Wu | ........................ | H04L 5/0092 |
| 2023/0119379 A1* | 4/2023 | Kim | ...................... | H04W 72/23 |
| | | | | 370/311 |
| 2023/0247501 A1* | 8/2023 | Kim | ...................... | H04W 36/06 |
| | | | | 370/331 |

FOREIGN PATENT DOCUMENTS

| | | | | |
|---|---|---|---|---|
| WO | WO-2019084570 A1 * | 5/2019 | ........... | H04B 17/318 |
| WO | WO-2022086213 A1 * | 4/2022 | | |
| WO | WO-2022152924 A1 * | 7/2022 | | |
| WO | WO-2023013539 A1 * | 2/2023 | ............ | H04W 28/18 |

* cited by examiner

TECHNIQUES FOR PERFORMING BANDWIDTH PART SWITCHING

FIELD OF TECHNOLOGY

The following relates to wireless communications, including techniques for performing bandwidth part (BWP) switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to communicate periodic data bursts with a base station using a first bandwidth part (BWP). In some cases, the UE may switch to a second BWP, such as when the UE is not communicating the periodic data burst to reduce power consumption of the UE. Techniques for switching to the second BWP may be improved.

SUMMARY

The described techniques relate to improved methods, systems, devices, and apparatuses that support techniques for performing bandwidth part (BWP) switching. Generally, the described techniques provide for improved methods of switching between different BWPs by a user equipment (UE). A UE may be configured with one or more timers for use in determining whether the UE has enough time in between the end of a first instance of a periodic data burst and a beginning of a second instance of the periodic data burst to switch between BWPs. For example, an inactivity timer may be triggered by receipt of a UE of one or more downlink control channel messages, such as a downlink control channel message associated with a first instance of a periodic data burst. Based on the downlink control message, the UE may communicate with a base station via the first instance of the periodic data burst, where the periodic data burst may include one or more uplink or downlink transmissions scheduled on a first BWP. The UE may start a bandwidth switching timer at the beginning of the first instance of the periodic data burst. The UE may identify an expiration of an inactivity timer and determine whether the bandwidth switching timer has expired upon expiration of the inactivity timer. The UE may operate, based on the determination, on one of the first BWP or a second BWP during at least a portion of a time period that extends from the expiration of the inactivity timer and a beginning of a second instance of the periodic data burst.

A method for wireless communications at a UE is described. The method may include communicating with a base station via a first instance of a periodic data burst, where the periodic data burst includes one or more uplink or downlink transmissions scheduled on a first BWP, starting a bandwidth switching timer in connection with the first instance of the periodic data burst, determining whether the bandwidth switching timer has expired based upon an inactivity timer triggered by one or more downlink control channel messages, and operating, based on the determination, on one of the first BWP or a second BWP during at least a portion of a time period that extends from the expiration of the inactivity timer and a second instance of the periodic data burst.

An apparatus for wireless communications is described. The apparatus may include a processor, memory coupled with the processor, and instructions stored in the memory. The instructions may be executable by the processor to cause the apparatus to communicate with a base station via a first instance of a periodic data burst, where the periodic data burst includes one or more uplink or downlink transmissions scheduled on a first BWP, start a bandwidth switching timer in connection with the first instance of the periodic data burst, determine whether the bandwidth switching timer has expired based upon an inactivity timer triggered by one or more downlink control channel messages, and operating, base at least in part on the determination, on one of the first BWP or a second BWP during at least a portion of a time period that extends from the expiration of the inactivity timer and a second instance of the periodic data burst.

Another apparatus for wireless communications is described. The apparatus may include means for communicating with a base station via a first instance of a periodic data burst, where the periodic data burst includes one or more uplink or downlink transmissions scheduled on a first BWP, means for starting a bandwidth switching timer in connection with the first instance of the periodic data burst, means for determining whether the bandwidth switching timer has expired based upon an inactivity timer triggered by one or more downlink control channel messages, and means for operating, based on the determination, on one of the first BWP or a second BWP during at least a portion of a time period that extends from the expiration of the inactivity timer and a second instance of the periodic data burst.

A non-transitory computer-readable medium storing code for wireless communications is described. The code may include instructions executable by a processor to communicate with a base station via a first instance of a periodic data burst, where the periodic data burst includes one or more uplink or downlink transmissions scheduled on a first BWP, start a bandwidth switching timer in connection with the first instance of the periodic data burst, determine whether the bandwidth switching timer has expired based upon an inactivity timer triggered by one or more downlink control channel messages, and operating, base at least in part on the determination, on one of the first BWP or a second BWP during at least a portion of a time period that extends from the expiration of the inactivity timer and a second instance of the periodic data burst.

In some examples of the method, apparatuses, and non-transitory computer-readable medium described herein, determining whether the bandwidth switching timer may have expired may include operations, features, means, or instructions for determining that the bandwidth switching timer may have expired upon the expiration of the inactivity timer and remaining on the first BWP from at least the expiration of the inactivity timer to an expiration of the second instance of the periodic data burst.

In some examples of the method, apparatuses, and non-transitory computer-readable medium described herein, determining whether the bandwidth switching timer may have expired may include operations, features, means, or instructions for determining that the bandwidth switching timer may be running upon the expiration of the inactivity timer and operating on the second BWP during at least the portion of the time period, where at least the portion of the time period includes at least two BWP switch delays based on operating on the second BWP.

Some examples of the method, apparatuses, and non-transitory computer-readable medium described herein may further include operations, features, means, or instructions for operating in accordance with a first switch delay portion upon the expiration of the inactivity timer, operating on the second BWP upon completion of the first switch delay portion, operating in accordance with a second switch delay portion based on receiving a downlink control message while operating in the second BWP, and operating on the first BWP upon completion of the second switch delay portion, where the beginning of the second instance of the periodic data burst starts based on operating on the first BWP.

Some examples of the method, apparatuses, and non-transitory computer-readable medium described herein may further include operations, features, means, or instructions for receiving an indication of a duration of the bandwidth switching timer, the indication included in a radio resource control message.

Some examples of the method, apparatuses, and non-transitory computer-readable medium described herein may further include operations, features, means, or instructions for receiving an indication of a duration associated with each burst of the periodic data burst and an offset from a beginning of the duration to the beginning of the first instance, the indication included in a radio resource control message.

Some examples of the method, apparatuses, and non-transitory computer-readable medium described herein may further include operations, features, means, or instructions for identifying that the beginning of the first instance may have started based on the duration and the offset, where starting the bandwidth switching timer may be based on identifying the beginning.

Some examples of the method, apparatuses, and non-transitory computer-readable medium described herein may further include operations, features, means, or instructions for receiving a message indicating the beginning of the first instance, where starting the bandwidth switching timer may be based on the message.

In some examples of the method, apparatuses, and non-transitory computer-readable medium described herein, receiving the message may include operations, features, means, or instructions for receiving a medium access control (MAC) message including an indication of the beginning of the first instance, where the indication may be included in a MAC control element (MAC-CE) or downlink control information (DCI) of the MAC message.

Some examples of the method, apparatuses, and non-transitory computer-readable medium described herein may further include operations, features, means, or instructions for receiving a message including an instance identifier, where the message may be a packet data convergence protocol message, determining whether the instance identifier may be different from a previously received instance identifier, and determining whether to start the bandwidth switching timer based on whether the instance identifier may be different from the previously received instance identifier.

In some examples of the method, apparatuses, and non-transitory computer-readable medium described herein, determining whether the instance identifier may be different may include operations, features, means, or instructions for determining that the instance identifier may be different from the previously received instance identifier, where starting the bandwidth switching timer may be based on the instance identifier being different from the previously received instance identifier.

Some examples of the method, apparatuses, and non-transitory computer-readable medium described herein may further include operations, features, means, or instructions for receiving a MAC message associated with the periodic data burst and identifying whether the bandwidth switching timer may be running based on receiving the MAC message, where starting the bandwidth switching timer may be based on identifying that the bandwidth switching timer was not already running.

Some examples of the method, apparatuses, and non-transitory computer-readable medium described herein may further include operations, features, means, or instructions for receiving an indication of a burst start timer to start at the beginning of the first instance of the periodic data burst.

Some examples of the method, apparatuses, and non-transitory computer-readable medium described herein may further include operations, features, means, or instructions for receiving a MAC message associated with the periodic data burst, identifying whether the burst start timer may be running based on receiving the MAC message, and determining whether to start the burst start timer and the bandwidth switching timer based on whether the burst start timer may be running.

Some examples of the method, apparatuses, and non-transitory computer-readable medium described herein may further include operations, features, means, or instructions for starting the burst start timer and the bandwidth switching timer based on identifying that the burst start timer may be not running.

Some examples of the method, apparatuses, and non-transitory computer-readable medium described herein may further include operations, features, means, or instructions for receiving a message indicating a duration of the burst start timer, the duration included in a radio resource control message.

In some examples of the method, apparatuses, and non-transitory computer-readable medium described herein, a duration of the burst start timer may be longer than a duration of the bandwidth switching timer and less than a duration of the periodic data burst.

Some examples of the method, apparatuses, and non-transitory computer-readable medium described herein may further include operations, features, means, or instructions for identifying the expiration of the inactivity timer and stopping the bandwidth switching timer based on identifying the expiration of the inactivity timer.

In some examples of the method, apparatuses, and non-transitory computer-readable medium described herein, the bandwidth switching timer may be equal to a duration of the periodic data burst minus two times a BWP switch delay.

In some examples of the method, apparatuses, and non-transitory computer-readable medium described herein, the first BWP may be a high power BWP and the second BWP may be a low power BWP.

A method for wireless communications at a base station is described. The method may include communicating with a UE via a first instance of a periodic data burst, where the periodic data burst includes one or more uplink or downlink transmissions scheduled on a first BWP, starting a bandwidth switching timer in connection with the first instance of the periodic data burst, determining whether the bandwidth switching timer has expired based upon an inactivity timer triggered by one or more downlink control channel messages, and identifying, based on whether the bandwidth switching timer has expired, whether the UE is operating on one of the first BWP or a second BWP during at least a portion of a time period that extends from the expiration of the inactivity timer and a second instance of the periodic data burst.

An apparatus for wireless communications is described. The apparatus may include a processor, memory coupled with the processor, and instructions stored in the memory. The instructions may be executable by the processor to cause the apparatus to communicate with a UE via a first instance of a periodic data burst, where the periodic data burst includes one or more uplink or downlink transmissions scheduled on a first BWP, start a bandwidth switching timer in connection with the first instance of the periodic data burst, determine whether the bandwidth switching timer has expired based upon an inactivity timer triggered by one or more downlink control channel messages, and identify, based on whether the bandwidth switching timer has expired, whether the UE is operating on one of the first BWP or a second BWP during at least a portion of a time period that extends from the expiration of the inactivity timer and a second instance of the periodic data burst.

Another apparatus for wireless communications is described. The apparatus may include means for communicating with a UE via a first instance of a periodic data burst, where the periodic data burst includes one or more uplink or downlink transmissions scheduled on a first BWP, means for starting a bandwidth switching timer in connection with the first instance of the periodic data burst, means for determining whether the bandwidth switching timer has expired based upon an inactivity timer triggered by one or more downlink control channel messages, and means for identifying, based on whether the bandwidth switching timer has expired, whether the UE is operating on one of the first BWP or a second BWP during at least a portion of a time period that extends from the expiration of the inactivity timer and a second instance of the periodic data burst.

A non-transitory computer-readable medium storing code for wireless communications is described. The code may include instructions executable by a processor to communicate with a UE via a first instance of a periodic data burst, where the periodic data burst includes one or more uplink or downlink transmissions scheduled on a first BWP, start a bandwidth switching timer in connection with the first instance of the periodic data burst, determine whether the bandwidth switching timer has expired based upon an inactivity timer triggered by one or more downlink control channel messages, and identify, based on whether the bandwidth switching timer has expired, whether the UE is operating on one of the first BWP or a second BWP during at least a portion of a time period that extends from the expiration of the inactivity timer and a second instance of the periodic data burst.

In some examples of the method, apparatuses, and non-transitory computer-readable medium described herein, determining whether the bandwidth switching timer may have expired may include operations, features, means, or instructions for determining that the bandwidth switching timer may have expired upon the expiration of the inactivity timer and identifying that the UE may be operating on the first BWP from at least the expiration of the inactivity timer to an expiration of the second instance of the periodic data burst.

In some examples of the method, apparatuses, and non-transitory computer-readable medium described herein, determining whether the bandwidth switching timer may have expired may include operations, features, means, or instructions for determining that the bandwidth switching timer may be running upon the expiration of the inactivity timer and identifying that the UE may be operating on the second BWP during at least the portion of the time period, where at least the portion of the time period includes at least two BWP switch delays based on operating on the second BWP.

Some examples of the method, apparatuses, and non-transitory computer-readable medium described herein may further include operations, features, means, or instructions for identifying a duration of the bandwidth switching timer for the UE and transmitting, to the UE, an indication of the duration of the bandwidth switching timer, the indication included in a radio resource control message.

Some examples of the method, apparatuses, and non-transitory computer-readable medium described herein may further include operations, features, means, or instructions for identifying the duration of the bandwidth switching timer may be based on the periodic data burst being periodic, latency sensitive, or both.

Some examples of the method, apparatuses, and non-transitory computer-readable medium described herein may further include operations, features, means, or instructions for transmitting an indication of a duration associated with each burst of the periodic data burst and an offset from a beginning of the duration to the beginning of the first instance, the indication included in a radio resource control message.

Some examples of the method, apparatuses, and non-transitory computer-readable medium described herein may further include operations, features, means, or instructions for identifying that the beginning of the first instance may have started based on the duration and the offset, where starting the bandwidth switching timer may be based on identifying the beginning.

Some examples of the method, apparatuses, and non-transitory computer-readable medium described herein may further include operations, features, means, or instructions for transmitting a MAC message at a, where starting the bandwidth switching timer may be based on a successful transmission of the MAC message.

In some examples of the method, apparatuses, and non-transitory computer-readable medium described herein, the MAC message includes an indication of the beginning of the first instance, the indication included in a MAC-CE or DCI of the MAC message.

Some examples of the method, apparatuses, and non-transitory computer-readable medium described herein may further include operations, features, means, or instructions for identifying a beginning of the first instance and transmitting a message including an instance identifier, where the message may be a packet data convergence protocol message, the instance identifier being different from a previously transmitted instance identifier, where starting the bandwidth switching timer may be based on the instance identifier being different from the previously transmitted instance identifier.

Some examples of the method, apparatuses, and non-transitory computer-readable medium described herein may further include operations, features, means, or instructions for transmitting an indication of a burst start timer to start at the beginning of the first instance of the periodic data burst, the indication included in a radio resource control message.

In some examples of the method, apparatuses, and non-transitory computer-readable medium described herein, a duration of the burst start timer may be longer than a duration of the bandwidth switching timer and less than a duration of the periodic data burst.

In some examples of the method, apparatuses, and non-transitory computer-readable medium described herein, the bandwidth switching timer may be equal to a duration of the periodic data burst minus two times a BWP switch delay.

In some examples of the method, apparatuses, and non-transitory computer-readable medium described herein, the first BWP may be a high power BWP and the second BWP may be a low power BWP.

DETAILED DESCRIPTION

Figure 1:
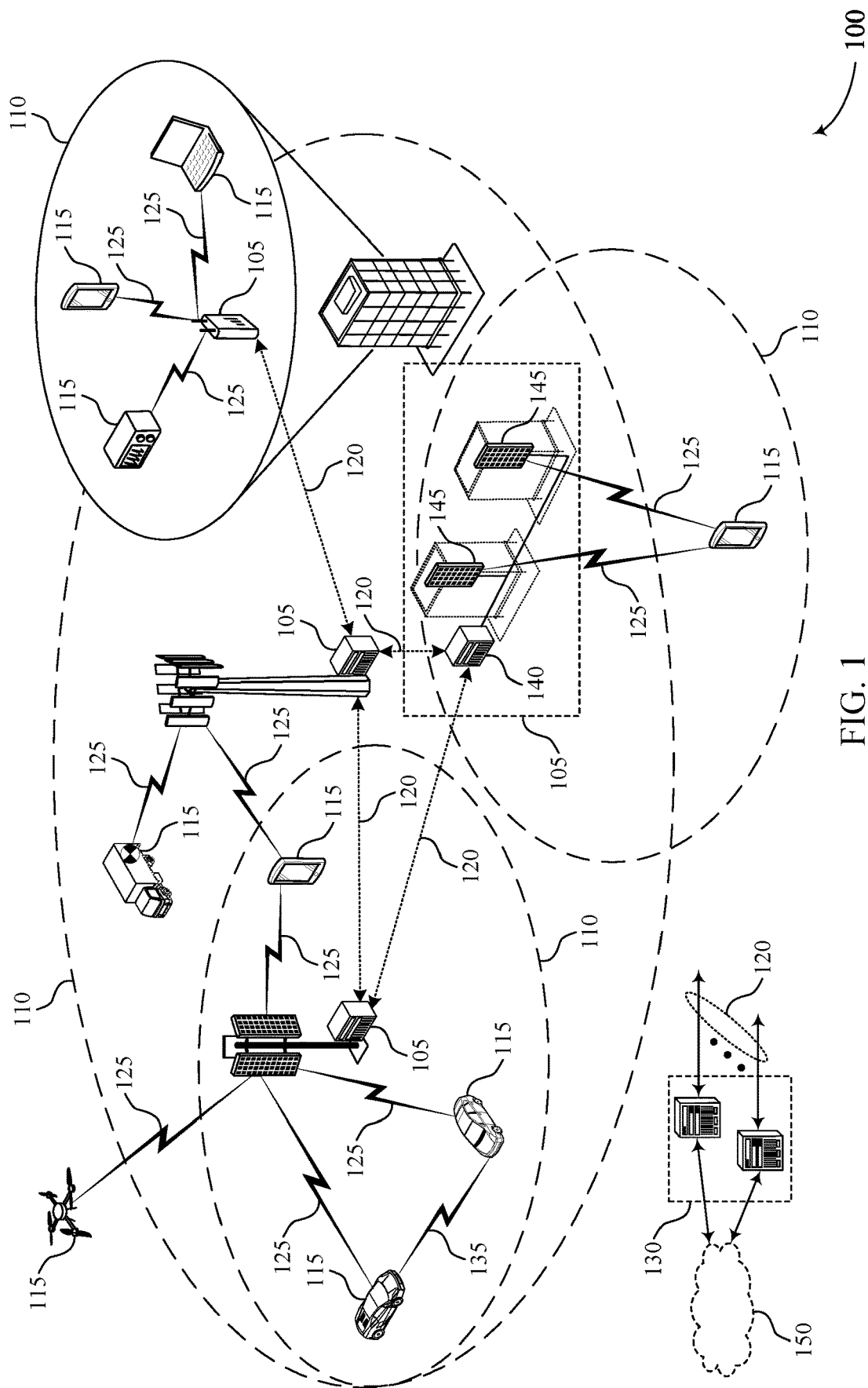
FIG. 1 illustrates an example of a wireless communications system that supports techniques for performing bandwidth part (BWP) switching in accordance with aspects of the present disclosure.

In some wireless communications systems, a user equipment (UE) may be configured, by a base station, to transmit or receive periodic data bursts, where the periodic data bursts may be scheduled to occur in accordance with a periodicity. To reduce power consumption of the UE, the UE may switch between at least two different bandwidth parts (BWPs) such as a first BWP (e.g., a high power BWP, high throughput BWP), and a second BWP (e.g., a default BWP, a low power BWP, a low throughput BWP), where the UE may use the first BWP to transmit or receive the periodic data bursts.

Prior to an instance of a periodic data burst, the UE may receive a downlink control channel message (e.g., downlink control information (DCI) that may indicate the instance of the periodic data (e.g., scheduling information). Upon receiving the downlink control channel message, the UE may start an inactivity timer and switch to the first BWP to receive the instance of the periodic data burst. After expiry of the inactivity timer, the UE may switch to the second BWP. To perform the switch from the first BWP to the second BWP, the UE may operate according to a switch delay in which the UE may not transmit or receive messages for a duration in between the first BWP and the second BWP. The UE may operate using the second BWP until the UE receives a second downlink control message indicating a second instance of the periodic data burst. Similarly to switching from the first BWP to the second BWP to the first BWP, the UE may operate according to a switch delay in which the UE may not transmit or receive messages for a duration in between the second BWP and the first BWP. In some cases, if the first instance of the data burst takes longer than expected (due to, for example, multiple retransmissions), the transition, by the UE, to the second BWP may be delayed. Due to the switch delay that occurs between each BWP switch, the UE's transition back to the first throughput BWP to receive the second instance of the periodic data burst may also be delayed. Accordingly, the UE may be delayed in receiving the second instance of the periodic data burst.

To reduce latency and power consumption, a UE may be configured with one or more additional timers to the inactivity timer for the UE to use in determining whether the UE has enough time to switch to the second BWP and back to the first BWP before a next instance of a periodic data burst. In one example, a base station may configure a BWP switching timer (e.g., a bandwidth switching timer, a BWP default switch timer). The UE may be configured to start the BWP switching timer upon the first data transmissions of the data burst. Accordingly, the UE may start an inactivity timer upon receiving a downlink control channel message indicating a periodic data burst instance, and the UE may start a BWP switching timer upon the first data transmission of the periodic data burst instance. Upon expiry of the inactivity timer, the UE may determine whether the BWP switching timer has expired. If the BWP switching timer has not expired, then the UE may conclude that there is enough time to switch to the second BWP, and back again prior to the next periodic data burst. Accordingly, the UE may switch to the second BWP before the next periodic data burst. If the BWP switching timer has expired, the UE may conclude that there is not enough time to switch to the second BWP before the next periodic data burst. Accordingly, the UE may remain in the first BWP until the next periodic data burst.

Particular aspects of the subject matter described herein may be implemented to realize one or more advantages. The described techniques may support improvements in transmitting or receiving periodic data bursts by allowing a device, such as a UE, to dynamically determine whether the device has enough time to switch to a low power BWP before a next instance of the periodic data burst. The described techniques may improve device coordination, improve reliability, and decrease latency among other advantages. As such, supported techniques may include improved network operations and, in some examples, may promote network efficiencies, among other benefits.

Aspects of the disclosure are initially described in the context of wireless communications systems. Aspects are then described with reference to Aspects of the disclosure are further illustrated by and described with reference to apparatus diagrams, system diagrams, and flowcharts that relate to techniques for performing BWP switching.

FIG. 1 illustrates an example of a wireless communications system 100 that supports techniques for performing BWP switching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a UE 115 may be configured to transmit or receive a periodic data burst with a base station 105. To reduce power consumption of the UE 115, the UE 115 may use a high power BWP (e.g., a first BWP) to transmit or receive the periodic data burst and the UE 115 may switch to a low power BWP (e.g., a second BWP, a default BWP) when the UE 115 is not transmitting or receiving the periodic data burst. To ensure that the UE 115 has enough time in between the end of a first instance of a periodic data burst and a beginning of a second instance of the periodic data burst to switch between the BWPs, the UE 115 may be configured with one or more timers. For example, an inactivity timer may be triggered by receipt of the UE 115 of one or more downlink control channel messages, such as a downlink control channel message associated with a first instance of a periodic data burst. Based on the downlink control message, the UE 115 may communicate with a base station 105 via the first instance of the periodic data burst, where the periodic data burst may include one or more uplink or downlink transmissions scheduled on a first BWP. The UE 115 may start a bandwidth switching timer at the beginning of the first instance of the periodic data burst. The UE 115 may identify an expiration of an inactivity timer and determine whether the bandwidth switching timer has expired upon expiration of the inactivity timer. The UE 115 may operate, based on the determination, on one of the first BWP or a second BWP during at least a portion of a time period that extends from the expiration of the inactivity timer and a beginning of a second instance of the periodic data burst. For example, if the BWP switching timer has not expired, then the UE 115 may conclude that there is enough time to switch to the second BWP, and back again prior to the next periodic data burst. Accordingly, the UE 115 may switch to the second BWP before the next periodic data burst. If the BWP switching timer has expired, the UE 115 may conclude that there is not enough time to switch to the second BWP before the next periodic data burst. Accordingly, the UE 115 may remain in the first BWP until the next periodic data burst.

Figure 2:
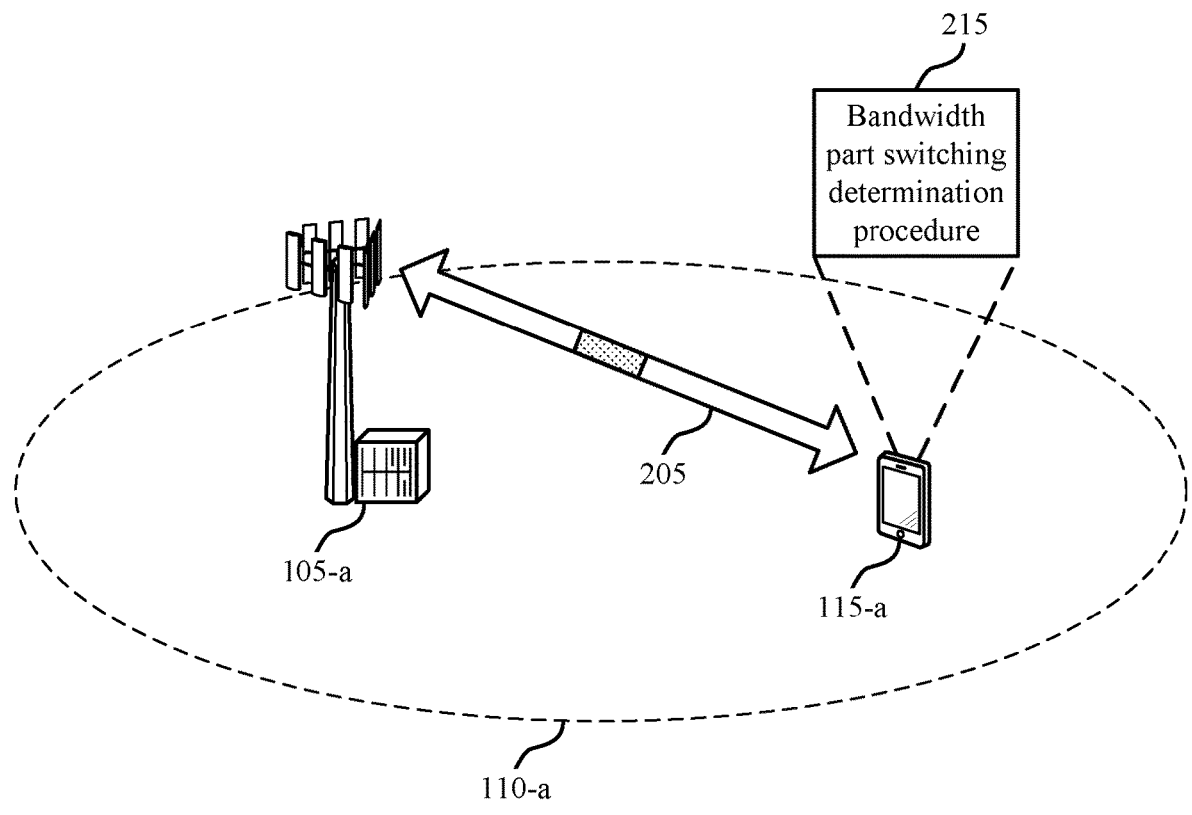
FIG. 2 illustrates an example of a wireless communications system that supports techniques for performing BWP switching in accordance with aspects of the present disclosure.

FIG. 2 illustrates an example of a wireless communications system 200 that supports techniques for performing BWP switching in accordance with aspects of the present disclosure. The wireless communications system 200 may include base station 105-a and UE 115-a, which may be examples of a base station 105 and a UE 115 as described with reference to FIG. 1. Base station 105-*a* may serve a geographic coverage area 110-*a*. In some cases, UE 115-*a* may implement a BWP switching determination procedure based on one or more timers. Additionally or alternatively, other wireless devices, such as base station 105-*a*, may implement a same or similar procedure as described herein.

In some wireless communications systems, a UE 115 may transmit or receive communications with a base station 105, and in some cases, the communications may occur periodically. For example, UE 115-*a* may be configured (e.g., scheduled) to communicate (e.g., transmit, receive) a periodic data burst 210 with base station 205-*a* in accordance with a periodicity (e.g., 100 bytes every 2 ms, or 100 Kbytes at 45, 60, 75, or 90 frames per second, for example). To reduce power consumptions at the UE 115, the UE 115 may be configured with at least two different BWPs, such as a high power BWP (e.g., high throughput BWP) and a default BWP (e.g., a lower power BWP, a low throughout BWP), where the device may use the high power BWP to transmit or receive data bursts. Accordingly, the UE 115 may switch to the default BWP in between instances of the periodic data burst 210. As described in more detail with reference to FIG. 3, switching to the low power BWP in between each instance of the periodic data burst 210 may result in increased latency of one or more instances of the periodic data burst 210.

In some cases, the periodic data burst 210 may be associated with a low latency traffic. For example, UE 115 may be a controller or headset used for communication purposes (e.g., extended reality (XR) gaming, Cloud gaming), and as such, to maintain the quality of experience of the user, latency should be reduced. To maintain quality of the periodic data burst 210, the UE 115 may be configured with a set of timers for use in determining whether to switch to the default BWP in between instances of the periodic data burst 210. Accordingly, UE 115-*a* may be configured to receive (or transmit) a periodic data burst from base station 105-*a* via a communication link 205 (e.g., a downlink communication link, a beam, a channel), where UE 115-*a* may receive instances of the periodic data burst 210 in accordance with a periodicity. Before switching to the default BWP in between instances, UE 115-*a* may perform a BWP switching determination procedure 215 using one or more timers included in the set of timers to determine whether UE 115-*a* has enough time in between instances to switch to the default BWP and back to the high power BWP before the next instance. By performing such a procedure, UE 115-*a* may experience increased quality and reduced latency associated with the periodic data burst 210.

Figure 3:
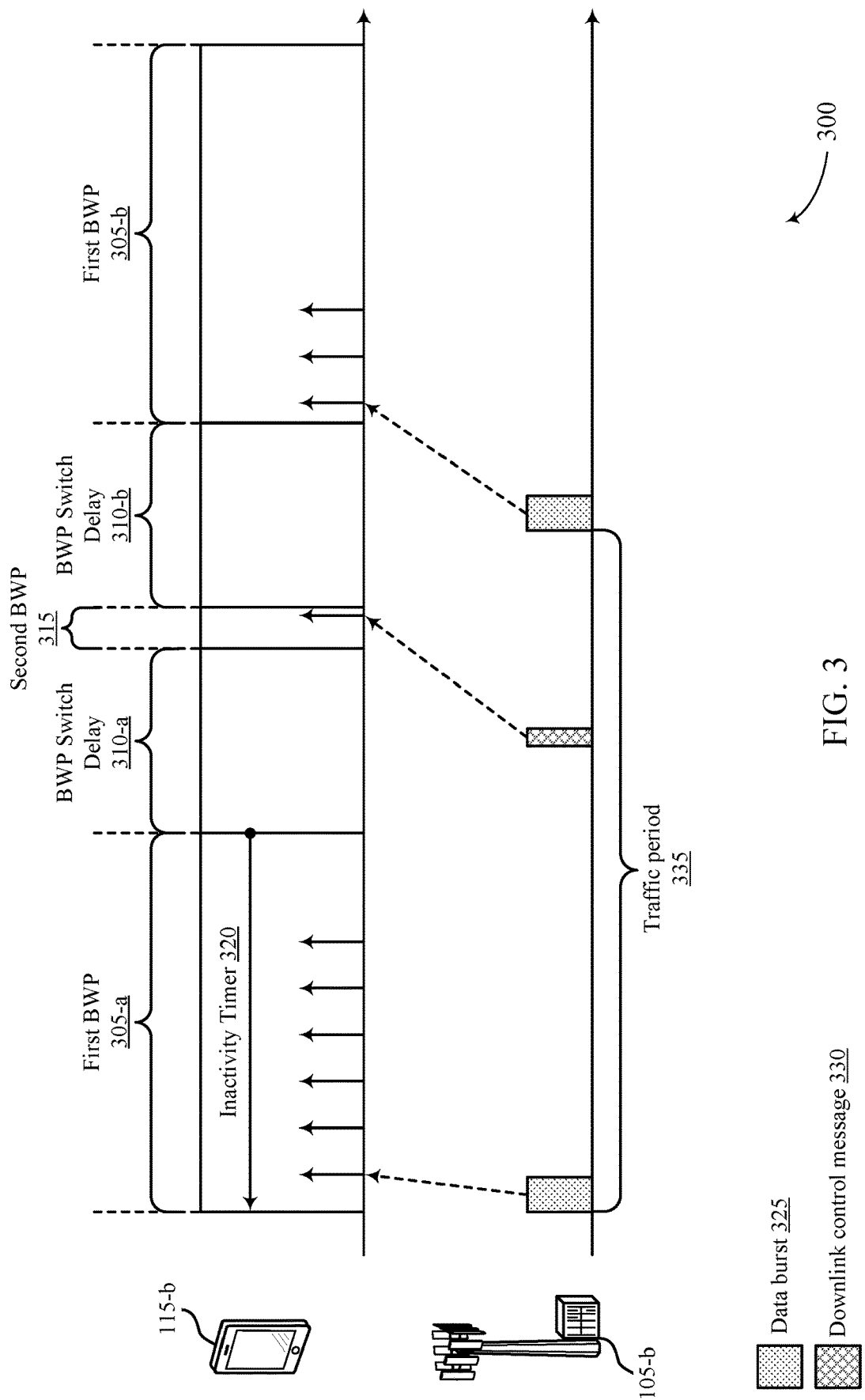
FIGS. 3, 4, and 5 illustrate examples of BWP switching procedures that support techniques for performing BWP switching in accordance with aspects of the present disclosure.

FIG. 3 illustrates an example of a BWP switching procedure 300 that supports techniques for performing BWP switching in accordance with aspects of the present disclosure. The BWP switching procedure 300 may be performed by base station 105-*b* and UE 115-*b*, which may be examples of a base station 105 and a UE 115 as described with reference to FIGS. 1 and 2. In some cases, UE 115-*b* may implement a BWP switching determination procedure based on one or more timers. Additionally or alternatively, other wireless devices, such as base station 105-*b*, may implement a same or similar procedure as described herein.

As described with reference to FIG. 2, to reduce power consumption at a UE 115, the UE 115 may be configured to use at least two different BWPs, such as a first BWP 305 (e.g., a high power BWP, a high throughput BWP, active BWP) and a second BWP 315 (e.g., a default BWP, a lower power BWP, a low throughout BWP). The UE 115 may use the first BWP 305 to transmit or receive data bursts and may switch to the second BWP 315 in between instances of the periodic data burst. The UE 115 may not receive the periodic data burst while using the second BWP 315. In some cases, a UE 115 may be prompted to switch BWPs by a downlink control message 330 (e.g., DCI), that may request the switch, or the UE 115 may be prompted to switch BWPs based on an expiration of a timer (e.g., an inactivity timer 320). In some cases, a delay may be added in between the BWPs to allow the UE 115 time to switch to the other BWP. For example, upon being prompted to switch BWPs, UE 115-*b* may operate in accordance with a BWP switch delay 310 in between switching from the first BWP 305 to the second BWP 315, and vice versa. While operating in accordance with the BWP switch delay 310, the UE 115 may not transmit or receive communications, including the periodic data burst, via the base station 105, or any other device and accordingly, a base station 105 may not schedule the UE 115 to transmit or receive during the BWP switch delay 310.

For example, UE 115-*b* may determine an instance of the data burst 325 based on a configured periodicity (e.g., traffic period 335) associated with the data burst 325 or based on signaling received from base station 105-*b*. For example, UE 115-*b* may receive a message (e.g., a downlink control message 330, such as a DCI message) from base station 105-*b* indicating an instance of a data burst 325. UE 115-*b* may start an inactivity timer 320 (e.g., BWP inactivity timer), when UE 115-*b* activates a BWP other than the default BWP, such as when UE 115-*b* activates the first BWP 305-*a*. In some cases, UE 115-*b* may restart the inactivity timer 320 when UE 115-*b* decodes a downlink control message 330 (e.g., DCI) that includes a downlink assignment, such as a downlink assignment of an instance of the data burst 325, for the active BWP (e.g., the first BWP 305). Accordingly, upon use or assignment of the first BWP 305-*a*, UE 115-*b* may start inactivity timer 320. A data burst 325 (e.g., a periodic data burst) may arrive in a transmission buffer of base station 105-*b*. As UE 115-*b* is operating in the first BWP 305-*a*, base station 105-*b* may transmit the data burst 325 as the data burst 325 arrives in the transmission buffer. The inactivity timer may be configured to expire sometime after a last transmission of a data burst 325. Upon expiry of the inactivity timer 320, UE 115-*b* may be prompted to switch to the second BWP 315. Accordingly, UE 115-*b* may operate in accordance with a BWP switch delay 310-*a* for a duration (e.g., a preconfigured duration) in which UE 115-*a* may not transmit or receives messages. Following the BWP switch delay 310-*a*, UE 115-*b* may use the second BWP 315.

To switch back to the first BWP 305 to receive another instance of the data burst 325, base station 105-*b* may transmit a downlink control message 330 (e.g., DCI) prompting UE 115-*b* to switch back to the first BWP 305. The downlink control message 330 may include an indication to switch BWPs, an indication of which BWP to switch to, scheduling information associated with the data burst 325, etc. Accordingly, upon receiving a downlink control message 330 in the second BWP 315, UE 115-*b* may enter the BWP switch delay 310-*b* before using the first BWP 305-*b*. When UE 115-*b* is operating in accordance with the first BWP 305-*b*, base station 105-*b* may transmit the data burst 325 to UE 115-*b*.

In some implementations, an instance of a data burst 325 may get delayed and take longer than expected to complete. For example, UE 115-*a* may experience low channel quality (e.g., low SNR) during transmission of a first instance of the data burst 325. In some cases, base station 105-*b* may transmit one or more retransmissions associated with the data burst 325. Accordingly, a duration of the data burst 325 may be longer than if the data burst 325 had been transmitted in normal to high channel quality conditions. Accordingly, the inactivity timer 320 may expire later than it otherwise would have, UE 115-*b* may enter the BWP switch delay 310-*a* later, and subsequently enter the second BWP 315 later (as compared to normal to high channel quality conditions). Due to the periodic nature of the data burst 325, base station 105-*b* may identify an arrival of a next instance of the data burst 325 (e.g., such as due to the traffic period 335 being defined and know to base station 105-*b*) and may determine to transmit a downlink control message 330 to UE 115-*b* to prompt UE 115-*b* to switch from the second BWP 315 to the first BWP 305-*b*. However, at the time of the determination, UE 115-*a* may still be operating according to the BWP switch delay 310-*a* due to the delayed reception of the previous instance of the data burst 325 and the delayed expiration of the inactivity timer 320. As such, base station 105-*b* may wait until the UE 115-*b* enters the second BWP 315 before transmitting the downlink control message 330. Upon entering the second BWP 315, UE 115-*b* may receive the downlink control message 330 prompting UE 115-*b* to switch to the first BWP 305-*b*. Accordingly, UE 115-*b* may operate in accordance with BWP switch delay 310-*b* before entering the first BWP 305-*b*. However, due to the delay in waiting for UE 115-*b* to enter the second BWP 315 to transmit the downlink control message 330, the base station 105-*b* may receive the data burst 325 in the transmission buffer before UE 115-*b* switches back to the first BWP 305-*b*. Therefore, base station 105-*b* must wait to transmit the data burst 325 until UE 115-*b* enters the first BWP 305-*b*. Accordingly, due to the initial delay in receiving a previous instance of a data burst 325, UE 115-*b* may experience latency in receiving one or more subsequent instances of the data burst 325. In such cases, it may be beneficial for UE 115-*b* to remain in the first BWP 305 to receive one or more subsequent instances of the data burst 325 (e.g., rather than switching between the first BWP 305 and the second BWP 315).

To reduce latency and improve performance, UE 115-*b* may be configured with a set of timers for use in determining whether UE 115-*b* has enough time in between instances of the periodic data burst to switch to the second BWP 315. In one example, UE 115-*b* may be configured with a BWP switching timer (e.g., a bandwidth switching timer, a BWP default switch timer). UE 115-*b* may be configured to start the BWP switching timer upon the first data instance of the data burst. Accordingly, UE 115-*b* may start an inactivity timer 320 upon receiving a downlink control channel message indicating a periodic data burst instance or upon entering the first BWP 305, and the UE 115 may start a BWP switching timer upon the first data transmission of the periodic data burst instance. Upon expiry of the inactivity timer 320, UE 115-*b* may determine whether the BWP switching timer has expired. If the BWP switching timer has not expired, then UE 115-*b* may conclude that there is enough time to switch to the second BWP 315, and back again, prior to the next periodic data burst instance. Accordingly, UE 115-*b* may switch to the second BWP 315 before the next instance periodic data burst without introducing delay. If the BWP switching timer has expired, UE 115-*b* may conclude that there is not enough time to switch to the second BWP 315 before the next periodic data burst. Accordingly, UE 115-*b* may remain in the first BWP 305 until the next periodic data burst.

Figure 4:
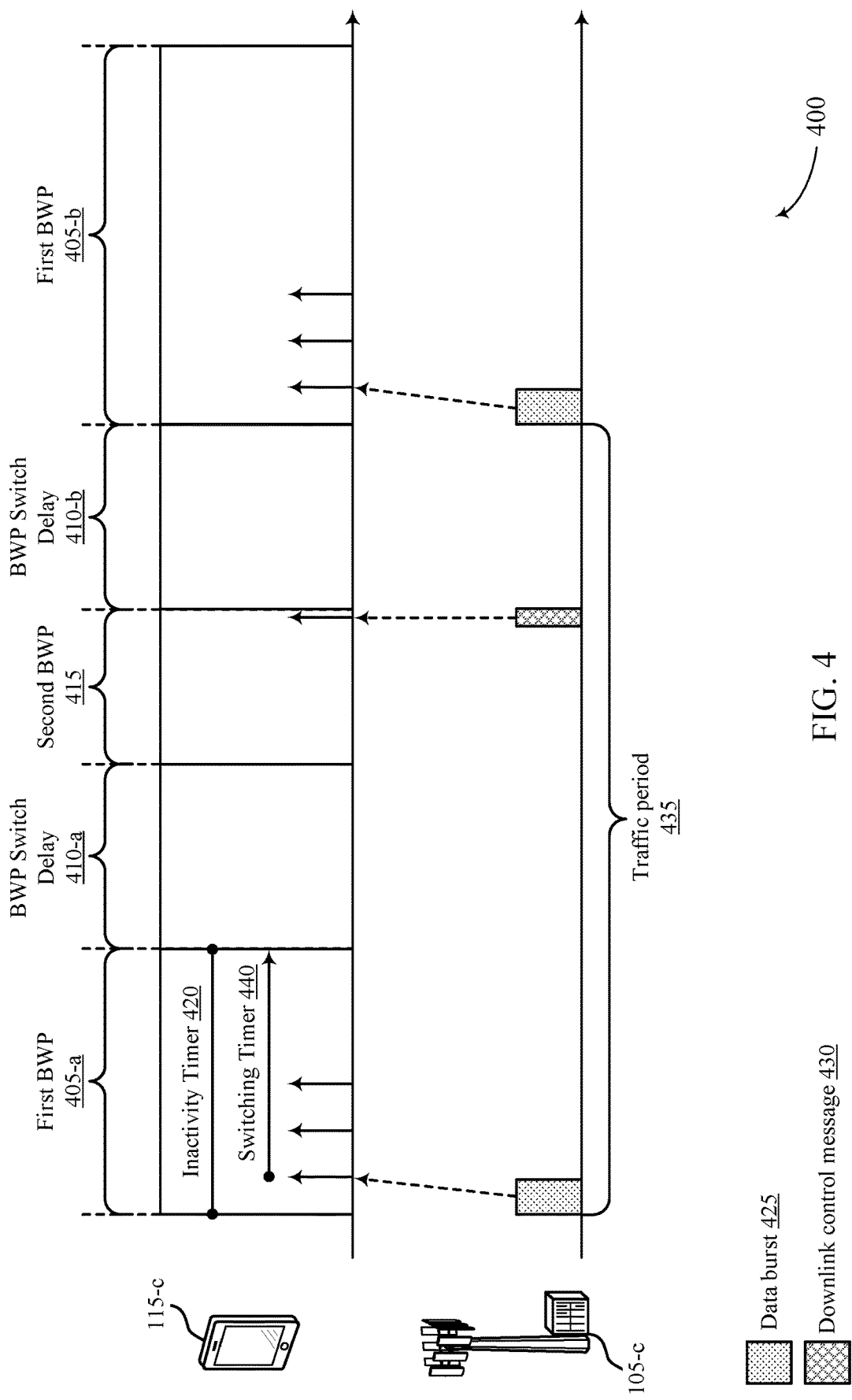

FIG. 4 illustrates an example of a BWP switching procedure 400 that supports techniques for performing BWP switching in accordance with aspects of the present disclosure. The BWP switching procedure 400 may be performed by base station 105-*c* and UE 115-*c*, which may be examples of a base station 105 and a UE 115 as described with reference to FIGS. 1 through 3. In some cases, UE 115-*c* may implement a BWP switching determination procedure based on one or more timers. Additionally or alternatively, other wireless devices, such as base station 105-*c*, may implement a same or similar procedure as described herein.

UE 115-*c* may be configured with a set of timers for use in determining whether UE 115-*c* has enough time in between instances of a periodic data burst to switch to a second BWP 415 without introducing delay in receiving the periodic data burst. The set of timers may include a switching timer 440 (e.g., a BWP switching timer, a BWP default switch timer, BWP_DefaultSwitchTimer). UE 115-*c* may be configured to start the switching timer 440 upon the first data reception of the data burst 425 and the switching timer 440 may be set to expire after a defined duration. In some cases, the duration of the switching timer 440 may be set to a duration approximately equal to the data burst period (e.g., traffic period 435) minus twice the BWP switch delay (e.g., traffic period−(2*BWP switch delay)).

Accordingly, UE 115-*c* may start the inactivity timer 420 upon receiving a downlink control message 430 scheduling an instance of the data burst 425, and/or upon entering the first BWP 405-*a* (e.g., the non-default BWP). Then, upon receiving a first transmission of the data burst 425, UE 115-*c* (and base station 105-*c*) may start the switching timer 440. UE 115-*c* may receive the remaining transmissions of the data burst and when the inactivity timer 420 expires, UE 115-*c* (and base station 105-*c*) may determine whether the switching timer 440 has expired. If the switching timer 440 has not expired, then UE 115-*c* may determine that there is enough time before the next instance of the periodic data burst to switch to the second BWP 415. If the switching timer 440 has expired, UE 115-*c* may determine that there is not enough time to switch to the second BWP 415. Accordingly, UE 115-*c* may remain in the first BWP 305-*a* until the next periodic data burst, as described in more detail with reference to FIG. 5.

For example, upon expiry of the inactivity timer 420, UE 115-*c* may determine that the switching timer 440 is still running. Therefore, UE 115-*c* may determine to switch to the second BWP 415. Accordingly, UE 115-*c* may operate according to the BWP switch delay 410-*a* upon expiry of the inactivity timer 420, and then enter the second BWP 415 after the completion of the BWP switch delay 410-*a*. In preparation for the arrival of the periodic data burst, base station 105-*c* may transmit a downlink control message 430 to UE 115-*c* while UE 115-*c* is in the second BWP 415. Upon receiving the downlink control message 430, UE 115-*c* may operate according to the BWP switch delay 410-*b*, and then enter the first BWP 405-*b* upon completion of the BWP switch delay 410-*b* to receive the data burst 425. As UE 115-*c* confirmed, based on the switching timer 440, that there was enough time for UE 115-*c* to switch BWPs, base station 105-*c* may transmit the data burst 425 as the data burst becomes available in the transmission buffer of base station 105-*c* (e.g., without or with reduced latency). Accordingly, the switch to the second BWP 415 may be based on an amount of elapsed time since the start of the last data burst.

Based on the comparison of the expiration of the inactivity timer 420 to the expiration of the switching timer 440, base station 105-*b* may determine whether UE 115-*c* will switch BWPs in between data burst instances, or whether UE 115-*c* will remain on the first BWP 405-*a*. Accordingly, base station 105-*a* may determine whether to transmit a downlink control message 430 to prompt UE 115-*c* to switch back to the first BWP 305.

In some implementations, UE 115-*c* may be configured with the switching timer 440 (e.g., a configuration of the switching timer 440, such as when to start the switching timer 440, a duration of the switching timer 440, what to do with the switching timer 440) aperiodically, semi-statically, or dynamically (e.g., via radio resource control (RRC), medium access control (MAC) control element (MAC-CE), or DCI signaling, respectively). For example, base station 105-*c* may identify (e.g., via quality of service (QoS) class identifier (QCI), or learning, such as machine learning) that the data burst 425 is periodic, and in some cases, base station 105-*c* may determine that the traffic associated with the 425 is latency sensitive. Base station 105-*c* may determine an amount of time (e.g., a duration of the switching timer 440), above which a switch to the default BWP (e.g., the second BWP 415) should not be done by UE 115-*c* based on the traffic being periodic and/or latency sensitive. Base station 105-*c* may determine the duration of the switching timer 440 to be equal to or approximately equal to the data burst period minus twice the BWP switch delay and may indicate the switching timer configuration to UE 115-*c* (e.g., via RRC signaling, MAC-CE signaling DCI signaling).

Figure 5:
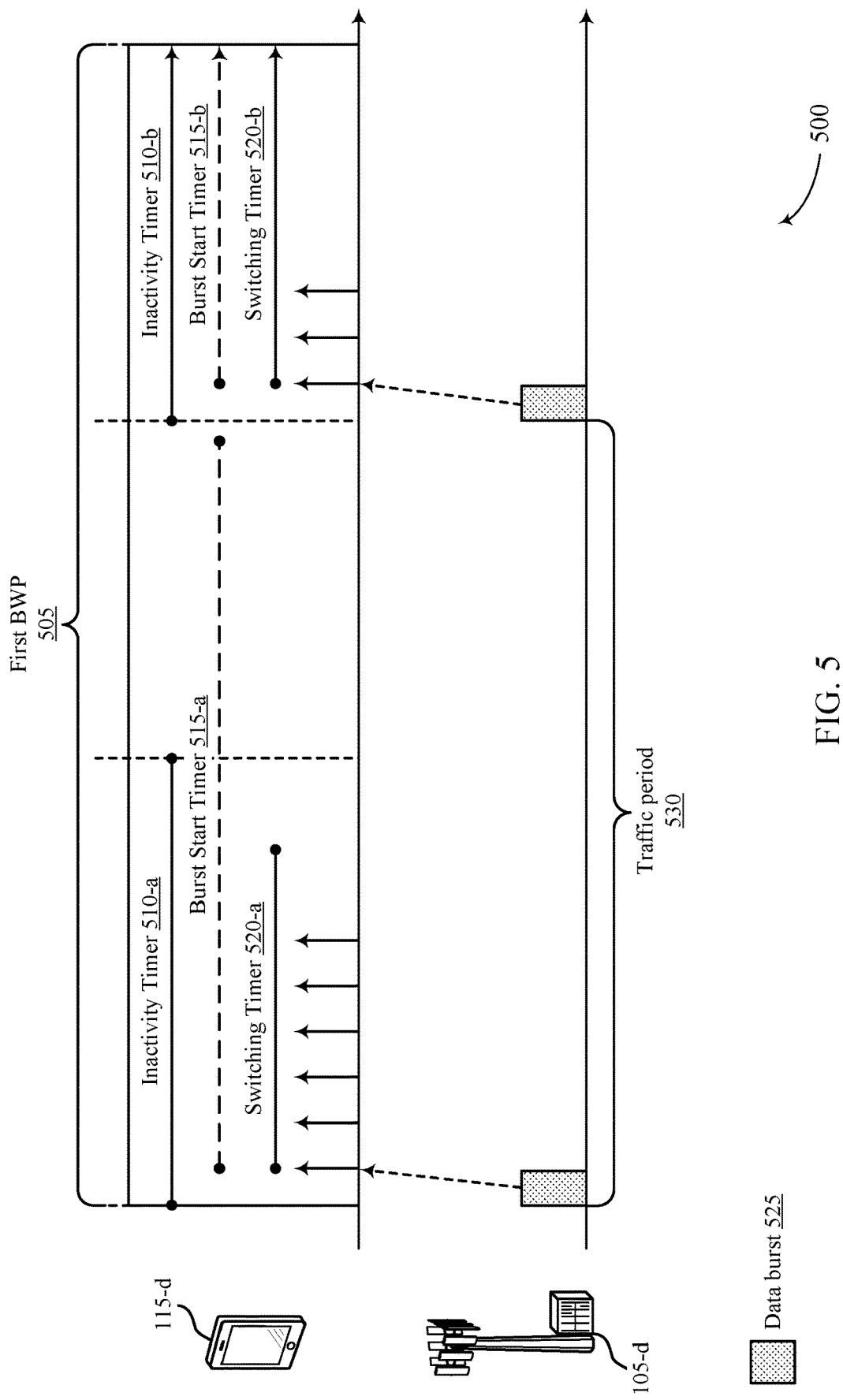

FIG. 5 illustrates an example of a BWP switching procedure 500 that supports techniques for performing BWP switching in accordance with aspects of the present disclosure. The BWP switching procedure 500 may be performed by base station 105-*d* and UE 115-*d*, which may be examples of a base station 105 and a UE 115 as described with reference to FIGS. 1 through 4. In some cases, UE 115-*d* may implement a BWP switching determination procedure based on one or more timers. Additionally or alternatively, other wireless devices, such as base station 105-*d*, may implement a same or similar procedure as described herein.

As described with reference to FIG. 4, a UE 115 may be configured to refrain from switching BWPs in between instances of a periodic data burst if a switching timer 520 has expired prior to or at the same time as an expiration of an inactivity timer 510. For example, UE 115-*d* may start a switching timer 520-*a* upon a first reception of a data burst 525 (e.g., when the data burst starts). UE 115-*d* may receive the remaining signals of the data burst 525 and the inactivity timer 510-*a* may expire sometime later. Upon expiration of the inactivity timer 510-*a*, UE 115-*d* may determine that switching timer 520-*a* has already expired (e.g., is not currently running). Accordingly, UE 115-*d* may determine that UE 115-*d* does not have enough time to switch to the second BWP and back to the first BWP 505 to receive the next instance of the periodic data burst without introducing latency. As such, UE 115-*d* may remain on the first BWP 505 until the next instance of the periodic data.

In some cases, because UE 115-*d* is already on the first BWP 505, base station 105-*d* may not transmit a downlink control message (e.g., DCI) indicating the next instance of the data burst 525. Rather, UE 115-*d* may identify the next instance of the data burst 525 based on the preconfigured traffic period 530. In some cases, base station 105-*d* may indicate (e.g., via DCI) the next instance of the data burst 525 to UE 115-*d*. As UE 115-*d* is operating on the first BWP 505, base station 105-*d* may transmit the data burst 525 to UE 115-*c* as the data burst 525 arrives in the transmission buffer of UE 115-*d*, without latency.

The UE 115 may be configured to identify the start of the data burst (and thus when to start the switching timer 520) based on a semi-static configuration, a dynamic indication from base station 105-*d*, or autonomously. For example, in the case of a semi-static indication to start the switching timer 520, base station 105-*d* may identify (e.g., by QCI or learning) that the traffic associated with the data burst 525 is periodic, and base station 105-*d* may determine the period and the offset inside the period where an instance of data burst will arrive. Base station 105-*d* may signal the determined period and offset to UE 115-*d* (e.g., via RRC signaling). Then, when the current time matches the offset inside the period, base station 105-*a* and UE 115-*d* may start the switching timer 520-*a*. Base station 105-*d* may determine the period and offset for each periodic data burst and may signal the period and offset at the start of each periodic data burst, as the period and offset of the periodic data burst may not change. Accordingly, UE 115-*d* may be semi-statically configured with the period and offset and may use the semi-statically configured period and offset to identify the start of each instance of the periodic data burst.

In another example, in the case of a dynamic indication of the start of a periodic data burst instance, base station 105-*d* may transmit dynamic signaling (e.g., dynamic out-of-band signaling) to indicate UE 115-*d* to start the switching timer 520. For example, when transmitting a first message (e.g., a MAC protocol data unit (PDU)) of a new instance of a periodic data burst, base station 105-*d* may start the switching timer 520 and indicate (e.g., via a DCI, or MAC-CE, or both) that the message (e.g., the PDU) associated with the indication (e.g., the DCI, or MAC-CE) is the start of a new instance of a periodic data burst. Upon reception of the indication, UE 115-*d* may start the switching timer 520.

In another example, in the case of a dynamic indication of the start of a periodic data burst instance, base station 105-*d* may transmit dynamic signaling (e.g., dynamic in-band signaling) to indicate UE 115-*d* to start the switching timer 520. In such cases, base station 105-*d* may reserve one or more bits for a field in a message, such as a Packet Data Convergence Protocol (PDCP) header, to indicate the start of a data burst instance (e.g., a 'newFrame' field). The field included in the PDCP header may indicate a start of a new instance of a periodic data burst (e.g., a new frame, a first transmission of a set of transmissions of a data burst). Accordingly, base station 105-*d* may transmit a first message (e.g., a PDCP PDU) of a new instance of a periodic data burst, and upon transmitting the first message, base station 105-*d* may start the switching timer 520 and increment the one or more bits of the new frame field. Upon reception of the message (e.g., the PDCP PDU), UE 115-*d* may check the value of the new frame field and determine whether the value matches the value of the new frame field received in a previous message (e.g., a previous PDCP PDU). If the value is different from the one received previously, UE 115-*d* may determine that this message is the first message of a data burst instance and UE 115-*d* may start the switching timer 520.

In another example, in the case of autonomous determination, the UE 115 may be configured to determine the start of a data burst instance based on whether the switching timer 520 is already running. For example, upon successful transmission of a first message (e.g., a MAC PDU) of a new instance of a data burst, base station 105-*d* may start the switching timer 520. Upon successful reception of the message (e.g., the MAC PDU) that carries the periodic traffic, UE 115-*d* may determine whether the switching timer 520 is already running. If the switching timer 520 is not already running (e.g., is not already started), then UE 115-*d* may conclude that the MAC PDU is the first MAC PDU of a data burst instance and may start the switching timer 520.

In some cases, upon expiry of the inactivity timer 510, UE 115-d and base station 105-d may determine whether the switching timer 520 has expired (e.g., and determine whether to switch BWPs). If the switching timer 520 has not yet expired, UE 115-d may stop the switching timer 520.

In some implementations, such as when UE 115-d is configured to autonomously determine a start of a new data burst instance, UE 115-d may be configured with burst start timer 515 (e.g., BWP_StartOfBurstTimer). Burst start timer 515 may ensure that UE 115-d does not restart the switching timer 520 in the middle of a data burst instance. For example, if a data burst takes longer than expected to complete (e.g., due to low SNR, a number of retransmissions), then the switching timer 520 may expire before the completion of the data burst 525. Accordingly, UE 115-d may receive a delayed transmission (e.g., a delayed MACPDU) of the same data burst 525, determine that switching timer 520 is not currently running and inaccurately determine that the delayed transmission is a first transmission of a new data burst instance based on the determination that the switching timer 520 was not already running upon reception of the delayed transmission. Accordingly, UE 115-d may be configured with burst start timer 515 for UE 115-d to use in determining whether UE 115-d is receiving transmissions as part of a new data burst instance.

Accordingly, base station 105-d may determine a duration of the burst start timer 515, where the duration may be a value less than (e.g., slightly less than) the traffic period 530 (e.g., period of the downlink XR traffic). Base station 105-d may transmit, to UE 115-d, a configuration of the burst start timer 515, where the configuration may include an indication to use the burst start timer 515, a duration of the burst start timer 515, when to start the burst start timer 515, how to use the burst start timer 515, etc. Base station 105-d may indicate the configuration via RRC signaling, MAC-CE signaling, DCI signaling, or a combination thereof.

According, upon successful transmission of a first MAC PDU of a new data burst instance, base station 105-d may start the burst start timer 515. Upon reception of a MAC PDU that carries traffic associated with a periodic data burst, UE 115-d may determine whether the burst start timer 515 is running. If the burst start timer 515 is not running, UE 115-d may start the burst start timer 515 and the switching timer 520. If however, the burst start timer 515 is running, UE 115-d may determine that the MAC PDU is not a first MAC PDU of a new data burst instance and accordingly, UE 115-d may not restart the burst start timer 515 or the switching timer 520.

For example, UE 115-d may receive a MAC PDU and determine that burst start timer 515-a is not currently running. Accordingly, UE 115-d may determine that the received MAC PDU is a first transmission of a new data burst instance, and UE 15-d may start the burst start timer 515-a and the switching timer 520-a. In this way, if UE 115-d receives a MAC PDU after expiry of switching timer 520-a, UE 115-d may appropriately determine that the MAC PDU is not a first MAC PDU of a new data burst instance because the burst start timer 515-a is still running.

Upon expiry of the inactivity timer 510-a, UE 115-d may determine that switching timer 520-a has already expired and UE 115-a may determine to remain on the first BWP 505. Burst start timer 515-a may be slightly less than the traffic period 530, and may expire just before the reception of the next data burst instance. UE 115-a may start inactivity timer 510-b, and UE 115-a may receive a MAC PDU of the next data burst instance. UE 115-d may determine that the burst start timer 515-a is not currently running, and start the burst start timer 515-b and the switching timer 520-b.

In some cases, UE 115-d may be configured to use the burst start timer 515 whenever UE 115-d is configured to autonomously determine a start of a data burst. In some cases, UE 115-d may be configured to use the burst start timer 515 when the channel quality between UE 115-d and base station 105-d is below a threshold.

Figure 6:
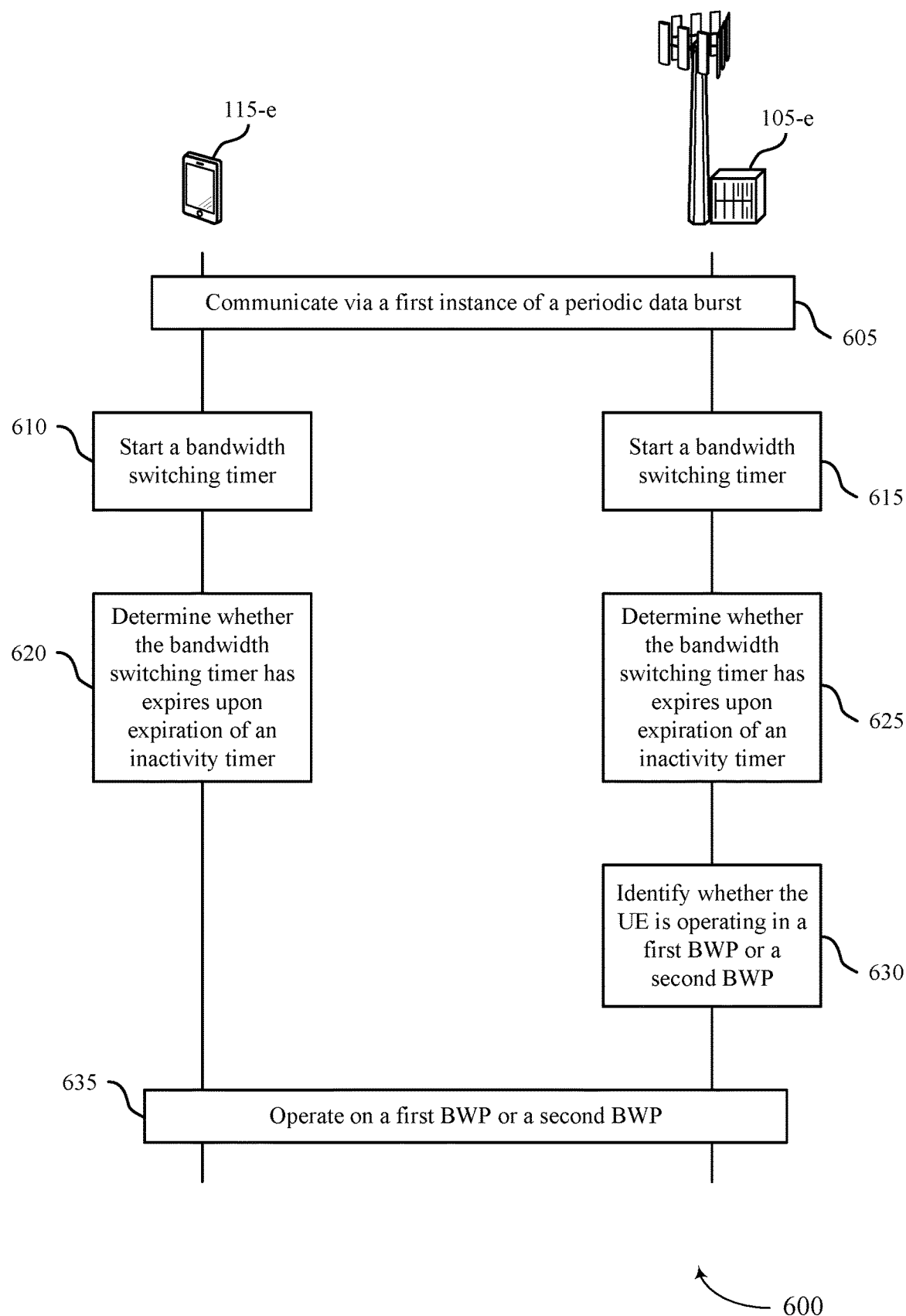
FIG. 6 illustrates an example of a process flow that supports techniques for performing BWP switching in accordance with aspects of the present disclosure.

FIG. 6 illustrates an example of a process flow 600 that supports techniques for performing BWP switching in accordance with aspects of the present disclosure. The process flow 600 may illustrate an example BWP switching determination procedure. For example, UE 115-e may be configured with one or more timers for UE 115-e to use in determining whether to switch BWPs between communicating periodic data bursts with base station 105-e. Base station 105-e and UE 115-e, may be examples of the corresponding wireless devices described with reference to FIGS. 2 through 5. In some cases, instead of UE 115-e implementing the BWP switching determination procedure, a different type of wireless device (e.g., a base station 105) may perform a same or similar procedure. Alternative examples of the following may be implemented, where some steps are performed in a different order than described or are not performed at all. In some cases, steps may include additional features not mentioned below, or further steps may be added.

At 605, UE 115-e may communicate with base station 105-e via a first instance of a periodic data burst, where the periodic data burst includes one or more uplink or downlink transmissions scheduled on a first BWP. In some cases, UE 115-e may receive an indication of a duration of the bandwidth switching timer, where the indication may be included in a radio resource control message. UE 115-e may receive an indication of a duration associated with each burst of the periodic data burst and an offset from a beginning of the duration to the beginning of the first instance, where the indication may be included in a radio resource control message. UE 115-e may identify that the beginning of the first instance has started based on the duration and the offset, where starting the bandwidth switching timer may be based on identifying the beginning.

In some implementations, UE 115-e may receive a message indicating the beginning of the first instance, where starting the bandwidth switching timer may be based on receiving the message. Receiving the message may include receiving a MAC message at the beginning of the first instance, where the MAC message may include an indication the beginning of the first instance. The indication may be included in a MAC-CE or DCI of the MAC message.

At 610, UE 115-e may start a bandwidth switching timer at the beginning of the first instance of the periodic data burst. In some cases, UE 115-e may receive a message including an instance identifier, where the message is a packet data convergence protocol message, and determine whether the instance identifier is different from a previously received instance identifier. UE 115-e may determine whether to start the bandwidth switching timer based on whether the instance identifier is different from the previously received instance identifier. Determining whether the instance identifier is different may include determining that the instance identifier is different from the previously received instance identifier, where starting the bandwidth switching timer is based on the instance identifier being different from the previously received instance identifier.

In some cases, UE 115-e may receive a MAC message associated with the periodic data burst, and identify whether the bandwidth switching timer is running based on receiving the MAC message. Starting the bandwidth switching timer may be based on identifying that the bandwidth switching timer was not already running.

In some cases, UE 115-e may receive an indication of a burst start timer to start at the beginning of the first instance of the periodic data burst. UE 115-e may receive a MAC message associated with the periodic data burst, identify whether the burst start timer is running based on receiving the MAC message, and determine whether to start the burst start timer and the bandwidth switching timer based on whether the burst start timer is running. UE 115-e may start the burst start timer and the bandwidth switching timer at a same time based on identifying that the burst start timer is not running. UE 115-e may receive a message indicating a duration of the burst start timer, the duration may be included in a radio resource control message. A duration of the burst start timer may be longer than a duration of the bandwidth switching timer and less than a duration of the periodic data burst.

At 615, base station 105-e may start a bandwidth switching timer at the beginning of the first instance of the periodic data burst.

At 620, UE 115-e may determine whether the bandwidth switching timer has expired upon expiration of an inactivity timer that was triggered by receipt of one or more downlink control channel messages. Determining whether the bandwidth switching timer has expired may include determining that the bandwidth switching timer has expired upon the expiration of the inactivity timer, and remaining on the first BWP from at least the expiration of the inactivity timer to an expiration of the second instance of the periodic data burst. Determining whether the bandwidth switching timer has expired may include determining that the bandwidth switching timer is running upon the expiration of the inactivity timer, and operating on the second BWP during at least the portion of the time period, where at least the portion of the time period includes at least two BWP switch delays based on operating on the second BWP.

In some cases, UE 115-e may operate in accordance with a first switch delay portion upon the expiration of the inactivity timer, operate on the second BWP upon completion of the first switch delay portion, operate in accordance with a second switch delay portion based on receiving a downlink control message while operating in the second BWP, and operate on the first BWP upon completion of the second switch delay portion. The beginning of the second instance of the periodic data burst may start based on operating on the first BWP.

In some cases, UE 115-e may identify the expiration of the inactivity timer, and stop the bandwidth switching timer based on identifying the expiration of the inactivity timer. The bandwidth switching timer may be equal to a duration of the periodic data burst minus two times a BWP switch delay. The first BWP may be a high power BWP (e.g., high throughput BWP) and the second BWP may be a low power BWP (e.g., low throughput BWP, default BWP). The first BWP and the second BWP may support the same throughput or different throughputs.

At 625, base station 105-e may determine whether the bandwidth switching timer has expired upon expiration of an inactivity timer that was triggered by transmission of one or more downlink control channel messages.

At 630, base station 105-e may identify, based on whether the bandwidth switching timer has expired, whether UE 115-e is operating on one of the first BWP or a second BWP during at least a portion of a time period that extends from the expiration of the inactivity timer and a beginning of a second instance of the periodic data burst.

At 635, UE 115-e may operate, based on the determination, on one of the first BWP or a second BWP during at least a portion of a time period that extends from the expiration of the inactivity timer and a beginning of a second instance of the periodic data burst.

Figure 7:
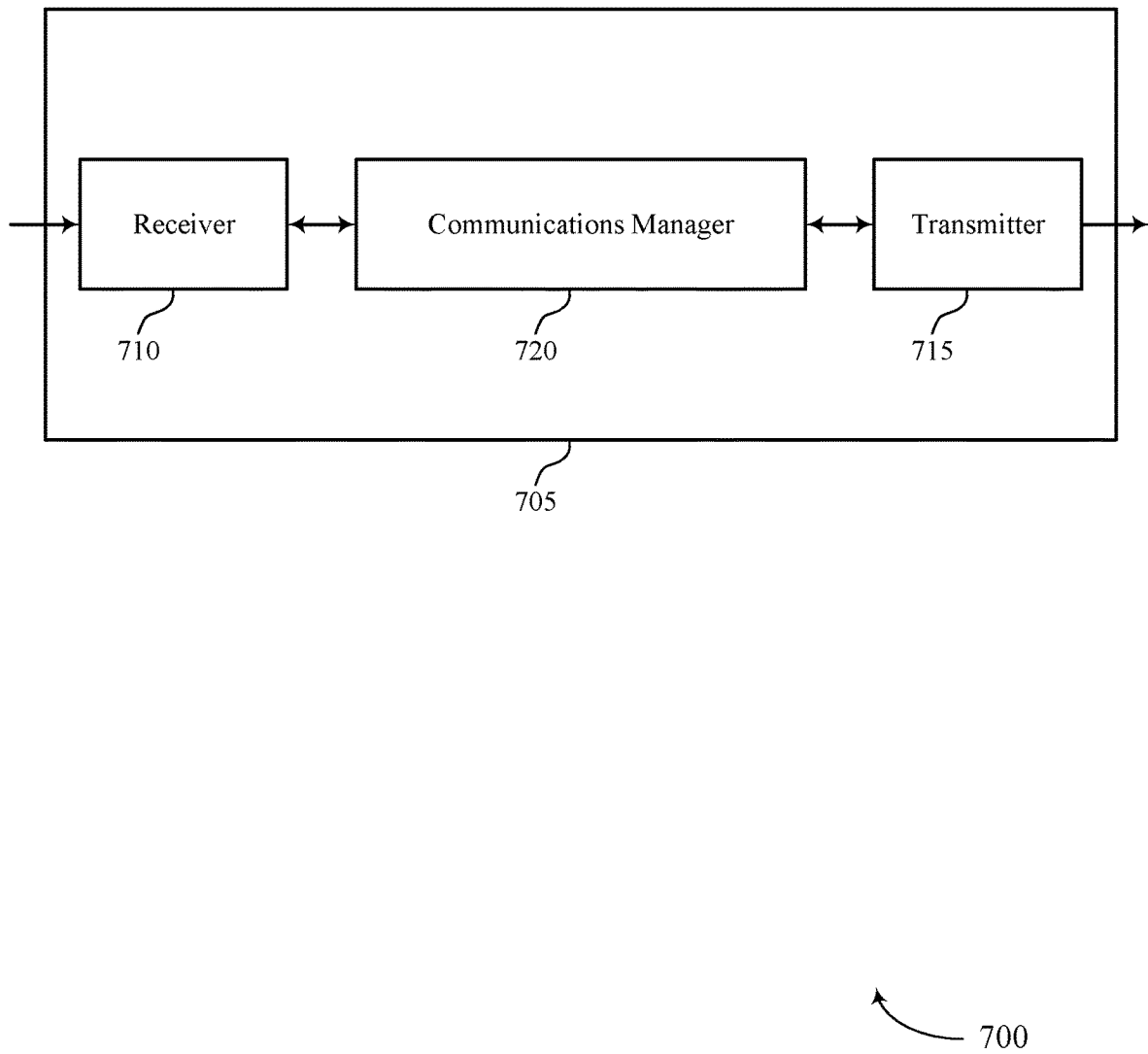
FIGS. 7 and 8 show block diagrams of devices that support techniques for performing BWP switching in accordance with aspects of the present disclosure.

FIG. 7 shows a block diagram 700 of a device 705 that supports techniques for performing BWP switching in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for performing BWP switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for performing BWP switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for performing BWP switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for communicating with a base station via a first instance of a periodic data burst, where the periodic data burst includes one or more uplink or downlink transmissions scheduled on a first BWP. The communications manager 720 may be configured as or otherwise support a means for starting a bandwidth switching timer in connection (e.g., at the beginning of) the first instance of the periodic data burst. The communications manager 720 may be configured as or otherwise support a means for determining whether the bandwidth switching timer has expired based upon an inactivity timer (e.g., expiration of an inactivity timer) triggered by one or more downlink control channel messages. The communications manager 720 may be configured as or otherwise support a means for operating, based at least in part on the determination, on one of the first BWP or a second BWP during at least a portion of a time period that extends from the expiration of the inactivity timer and a second instance of the periodic data burst.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption.

Figure 8:
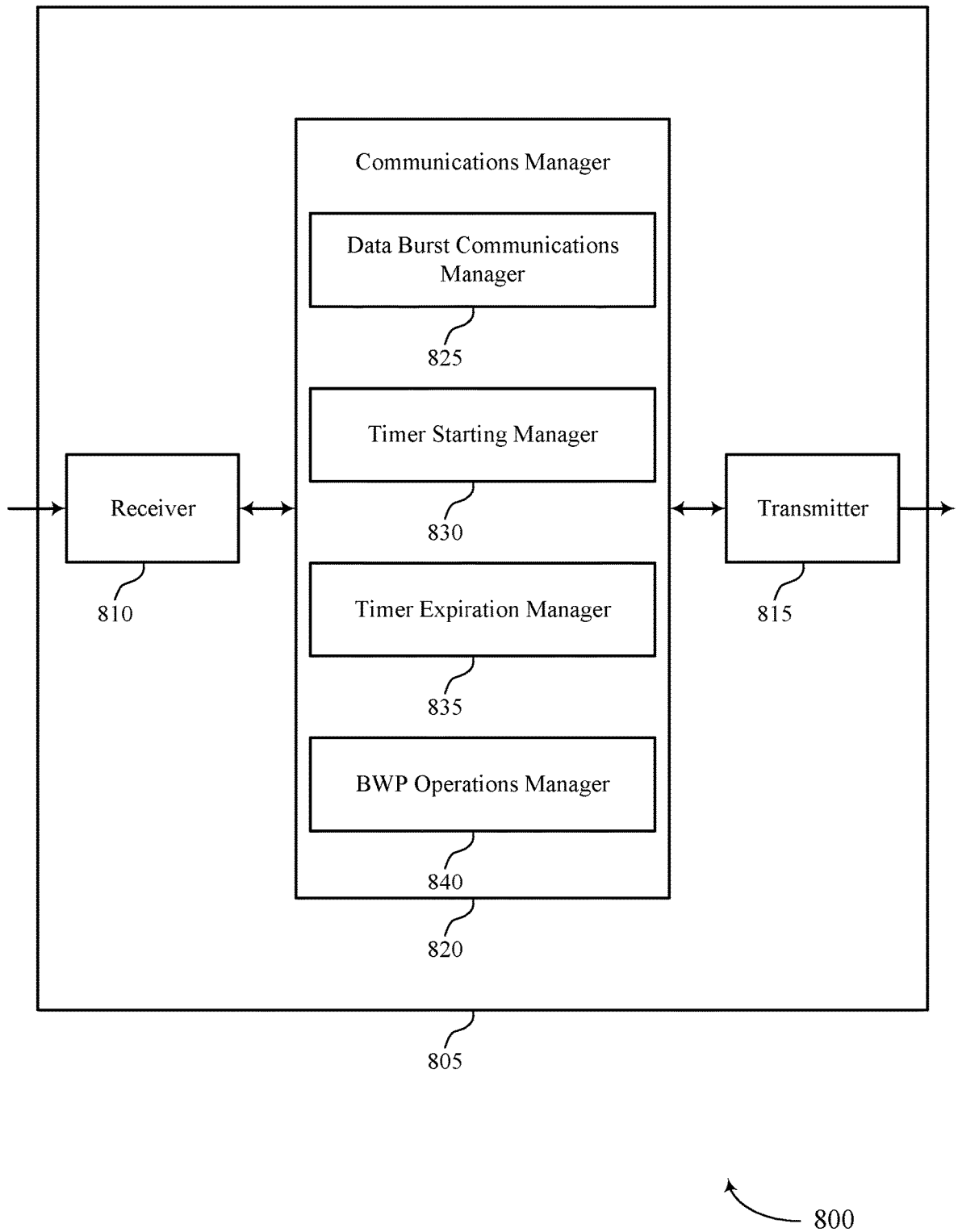

FIG. 8 shows a block diagram 800 of a device 805 that supports techniques for performing BWP switching in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for performing BWP switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for performing BWP switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for performing BWP switching as described herein. For example, the communications manager 820 may include a data burst communications manager 825, a timer starting manager 830, a timer expiration manager 835, a BWP operations manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The data burst communications manager 825 may be configured as or otherwise support a means for communicating with a base station via a first instance of a periodic data burst, where the periodic data burst includes one or more uplink or downlink transmissions scheduled on a first BWP. The timer starting manager 830 may be configured as or otherwise support a means for starting a bandwidth switching timer in connection with the first instance of the periodic data burst. The timer expiration manager 835 may be configured as or otherwise support a means for determining whether the bandwidth switching timer has expired based upon an inactivity timer triggered by one or more downlink control channel messages. The BWP operations manager 840 may be configured as or otherwise support a means for operating, based on the determination, on one of the first BWP or a second BWP during at least a portion of a time period that extends from the expiration of the inactivity timer and a second instance of the periodic data burst.

Figure 9:
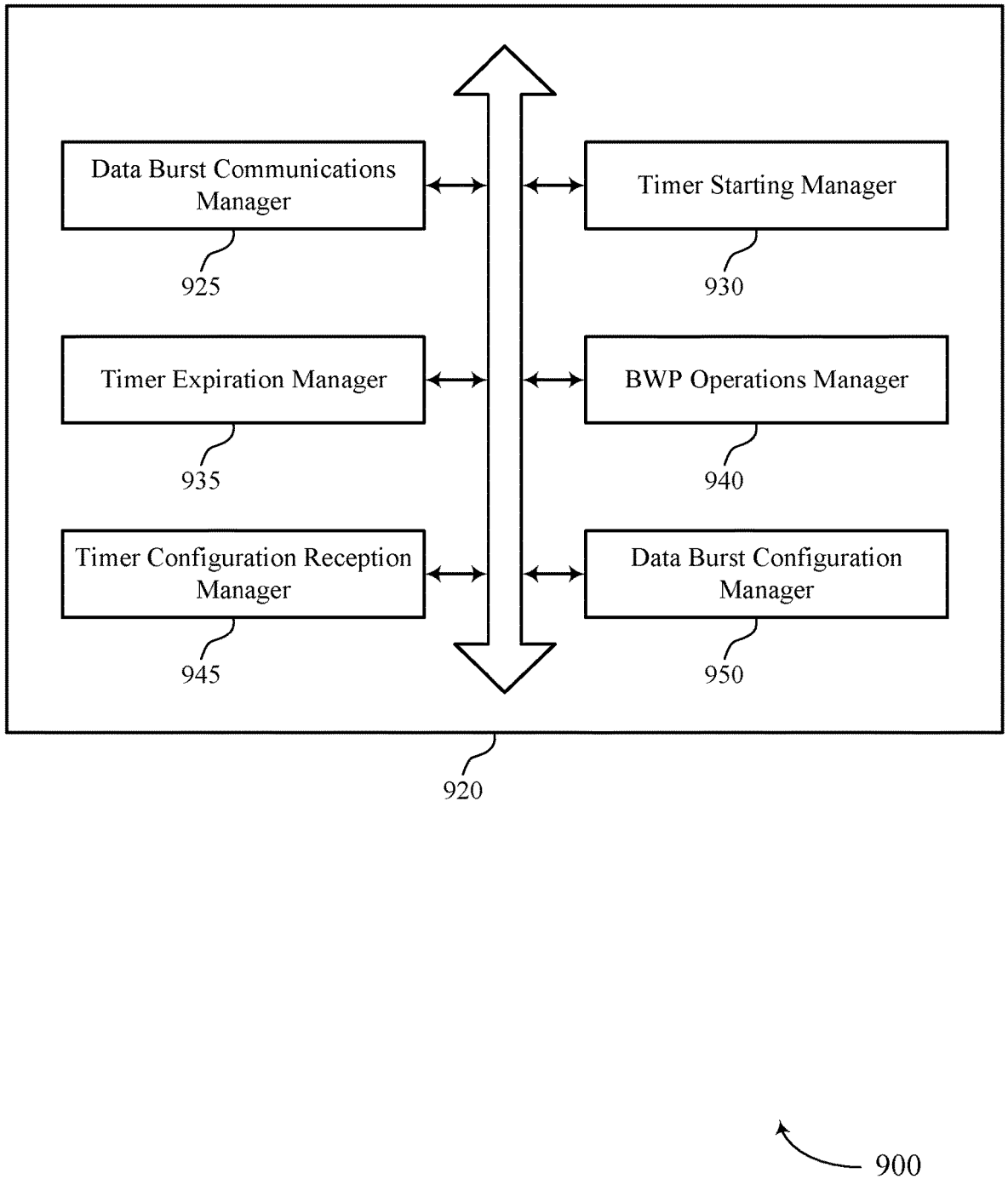
FIG. 9 shows a block diagram of a communications manager that supports techniques for performing BWP switching in accordance with aspects of the present disclosure.

FIG. 9 shows a block diagram 900 of a communications manager 920 that supports techniques for performing BWP switching in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for performing BWP switching as described herein. For example, the communications manager 920 may include a data burst communications manager 925, a timer starting manager 930, a timer expiration manager 935, a BWP operations manager 940, a timer configuration reception manager 945, a data burst configuration manager 950, or any combination thereof. Each of these components may communicate, directly or indirectly, with one another (e.g., via one or more buses).

The communications manager 920 may support wireless communications at a UE in accordance with examples as disclosed herein. The data burst communications manager 925 may be configured as or otherwise support a means for communicating with a base station via a first instance of a periodic data burst, where the periodic data burst includes one or more uplink or downlink transmissions scheduled on a first BWP. The timer starting manager 930 may be configured as or otherwise support a means for starting a bandwidth switching timer in connection with the first instance of the periodic data burst. The timer expiration manager 935 may be configured as or otherwise support a means for determining whether the bandwidth switching timer has expired based upon an inactivity timer triggered by one or more downlink control channel messages. The BWP operations manager 940 may be configured as or otherwise support a means for operating, based on the determination, on one of the first BWP or a second BWP during at least a portion of a time period that extends from the expiration of the inactivity timer a second instance of the periodic data burst.

In some examples, to support determining whether the bandwidth switching timer has expired, the timer expiration manager 935 may be configured as or otherwise support a means for determining that the bandwidth switching timer has expired upon the expiration of the inactivity timer. In some examples, to support determining whether the bandwidth switching timer has expired, the BWP operations manager 940 may be configured as or otherwise support a means for remaining on the first BWP from at least the expiration of the inactivity timer to an expiration of the second instance of the periodic data burst.

In some examples, to support determining whether the bandwidth switching timer has expired, the timer expiration manager 935 may be configured as or otherwise support a means for determining that the bandwidth switching timer is running upon the expiration of the inactivity timer. In some examples, to support determining whether the bandwidth switching timer has expired, the BWP operations manager 940 may be configured as or otherwise support a means for operating on the second BWP during at least the portion of the time period, where at least the portion of the time period includes at least two BWP switch delays based on operating on the second BWP.

In some examples, the BWP operations manager 940 may be configured as or otherwise support a means for operating in accordance with a first switch delay portion upon the expiration of the inactivity timer. In some examples, the BWP operations manager 940 may be configured as or otherwise support a means for operating on the second BWP upon completion of the first switch delay portion. In some examples, the BWP operations manager 940 may be configured as or otherwise support a means for operating in accordance with a second switch delay portion based on receiving a downlink control message while operating in the second BWP. In some examples, the BWP operations manager 940 may be configured as or otherwise support a means for operating on the first BWP upon completion of the second switch delay portion, where the beginning of the second instance of the periodic data burst starts based on operating on the first BWP.

In some examples, the timer configuration reception manager 945 may be configured as or otherwise support a means for receiving an indication of a duration of the bandwidth switching timer, the indication included in a radio resource control message.

In some examples, the data burst configuration manager 950 may be configured as or otherwise support a means for receiving an indication of a duration associated with each burst of the periodic data burst and an offset from a beginning of the duration to the beginning of the first instance, the indication included in a radio resource control message.

In some examples, the data burst configuration manager 950 may be configured as or otherwise support a means for identifying that the beginning of the first instance has started based on the duration and the offset, where starting the bandwidth switching timer is based on identifying the beginning.

In some examples, the data burst configuration manager 950 may be configured as or otherwise support a means for receiving a message indicating the beginning of the first instance, where starting the bandwidth switching timer is based on the message.

In some examples, to support receiving the message, the data burst configuration manager 950 may be configured as or otherwise support a means for receiving a MAC message including an indication of the beginning of the first instance, where the indication is included in a MAC-CE or DCI of the MAC message.

In some examples, the data burst configuration manager 950 may be configured as or otherwise support a means for receiving a message including an instance identifier, where the message is a packet data convergence protocol message. In some examples, the data burst configuration manager 950 may be configured as or otherwise support a means for determining whether the instance identifier is different from a previously received instance identifier. In some examples, the data burst configuration manager 950 may be configured as or otherwise support a means for determining whether to start the bandwidth switching timer based on whether the instance identifier is different from the previously received instance identifier.

In some examples, to support determining whether the instance identifier is different, the data burst configuration manager 950 may be configured as or otherwise support a means for determining that the instance identifier is different from the previously received instance identifier, where starting the bandwidth switching timer is based on the instance identifier being different from the previously received instance identifier.

In some examples, the data burst configuration manager 950 may be configured as or otherwise support a means for receiving a MAC message associated with the periodic data burst. In some examples, the timer expiration manager 935 may be configured as or otherwise support a means for identifying whether the bandwidth switching timer is running based on receiving the MAC message, where starting the bandwidth switching timer is based on identifying that the bandwidth switching timer was not already running.

In some examples, the timer configuration reception manager 945 may be configured as or otherwise support a means for receiving an indication of a burst start timer to start at the beginning of the first instance of the periodic data burst.

In some examples, the data burst communications manager 925 may be configured as or otherwise support a means for receiving a MAC message associated with the periodic data burst. In some examples, the timer expiration manager 935 may be configured as or otherwise support a means for identifying whether the burst start timer is running based on receiving the MAC message. In some examples, the timer starting manager 930 may be configured as or otherwise support a means for determining whether to start the burst start timer and the bandwidth switching timer based on whether the burst start timer is running.

In some examples, the timer starting manager 930 may be configured as or otherwise support a means for starting the burst start timer and the bandwidth switching timer (e.g., at a same time) based on identifying that the burst start timer is not running.

In some examples, the timer configuration reception manager 945 may be configured as or otherwise support a means for receiving a message indicating a duration of the burst start timer, the duration included in a radio resource control message.

In some examples, a duration of the burst start timer is longer than a duration of the bandwidth switching timer and less than a duration of the periodic data burst.

In some examples, the timer expiration manager 935 may be configured as or otherwise support a means for identifying the expiration of the inactivity timer. In some examples, the timer expiration manager 935 may be configured as or otherwise support a means for stopping the bandwidth switching timer based on identifying the expiration of the inactivity timer.

In some examples, the bandwidth switching timer is equal to a duration of the periodic data burst minus two times a BWP switch delay.

In some examples, the first BWP is a high power BWP and the second BWP is a low power BWP.

Figure 10:
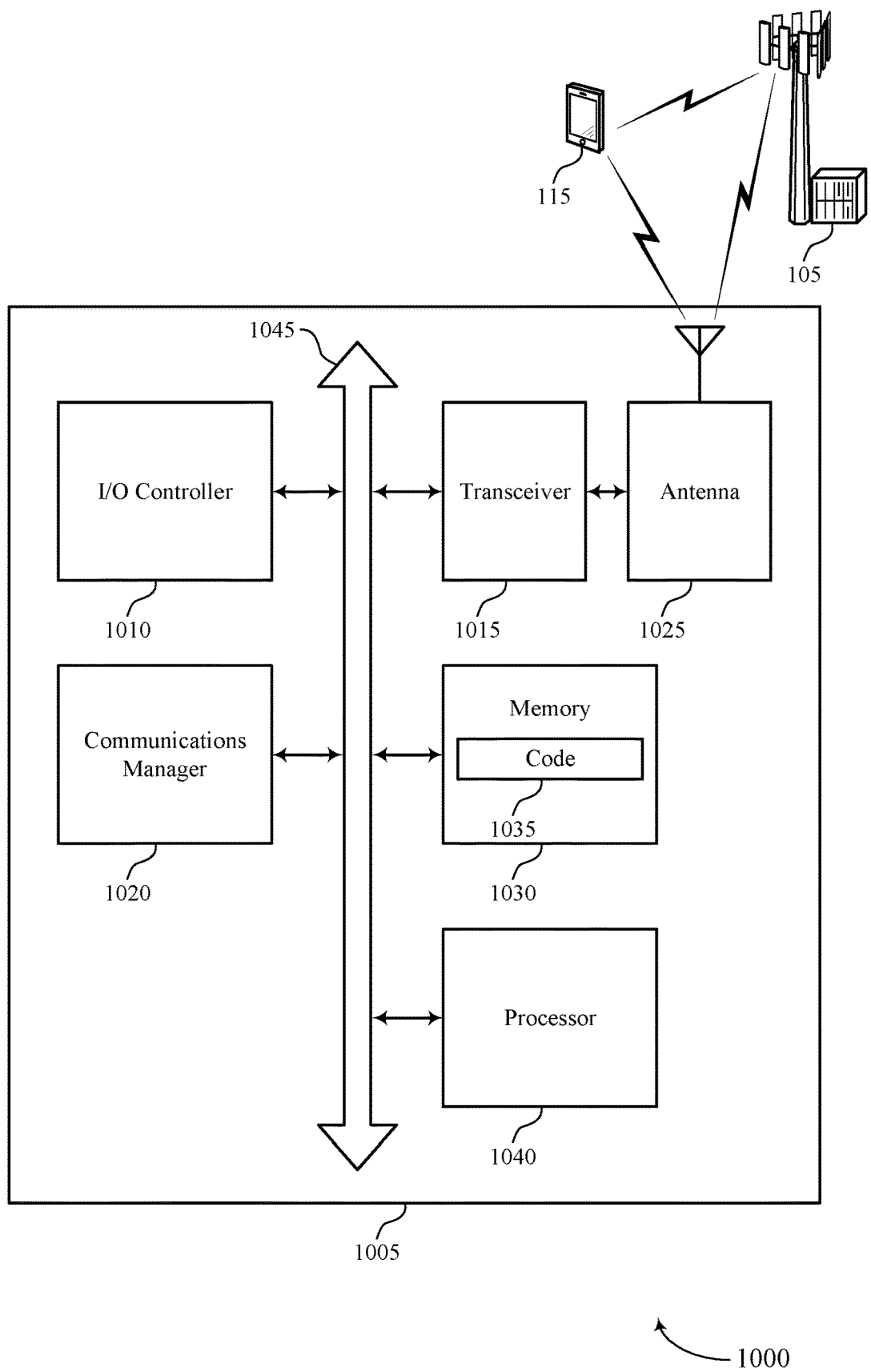
FIG. 10 shows a diagram of a system including a device that supports techniques for performing BWP switching in accordance with aspects of the present disclosure.

FIG. 10 shows a diagram of a system 1000 including a device 1005 that supports techniques for performing BWP switching in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for performing BWP switching). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for communicating with a base station via a first instance of a periodic data burst, where the periodic data burst includes one or more uplink or downlink transmissions scheduled on a first BWP. The communications manager 1020 may be configured as or otherwise support a means for starting a bandwidth switching timer in connection with the first instance of the periodic data burst. The communications manager 1020 may be configured as or otherwise support a means for determining whether the bandwidth switching timer has expired based upon an inactivity timer triggered by one or more downlink control channel messages. The communications manager 1020 may be configured as or otherwise support a means for operating, based at least in part on the determination, on one of the first BWP or a second BWP during at least a portion of a time period that extends from the expiration of the inactivity timer and a second instance of the periodic data burst.

By including or configuring the communications manager 1020 in accordance with examples as described herein, the device 1005 may support techniques for improved communication reliability, reduced latency, reduced power consumption, improved coordination between devices, and longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for performing BWP switching as described herein, or the processor 1040 and the memory 1030 may be otherwise configured to perform or support such operations.

Figure 11:
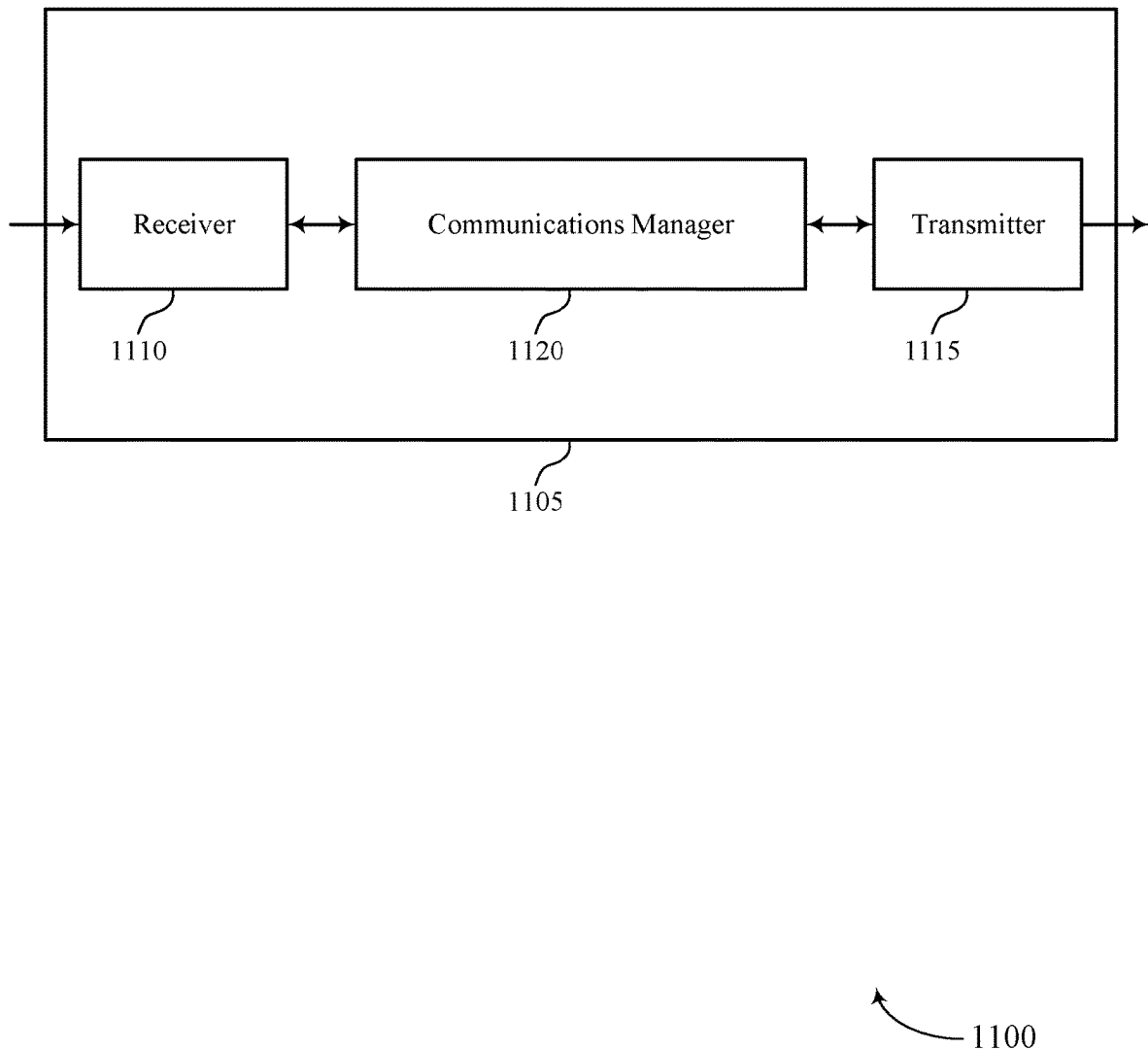
FIGS. 11 and 12 show block diagrams of devices that support techniques for performing BWP switching in accordance with aspects of the present disclosure.

FIG. 11 shows a block diagram 1100 of a device 1105 that supports techniques for performing BWP switching in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for performing BWP switching). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for performing BWP switching). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for performing BWP switching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for communicating with a UE via a first instance of a periodic data burst, where the periodic data burst includes one or more uplink or downlink transmissions scheduled on a first BWP. The communications manager 1120 may be configured as or otherwise support a means for starting a bandwidth switching timer in connection with the first instance of the periodic data burst. The communications manager 1120 may be configured as or otherwise support a means for determining whether the bandwidth switching timer has expired based upon an inactivity timer triggered by one or more downlink control channel messages. The communications manager 1120 may be configured as or otherwise support a means for identifying, based on whether the bandwidth switching timer has expired, whether the UE is operating on one of the first BWP or a second BWP during at least a portion of a time period that extends from the expiration of the inactivity timer and a second instance of the periodic data burst.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption.

Figure 12:
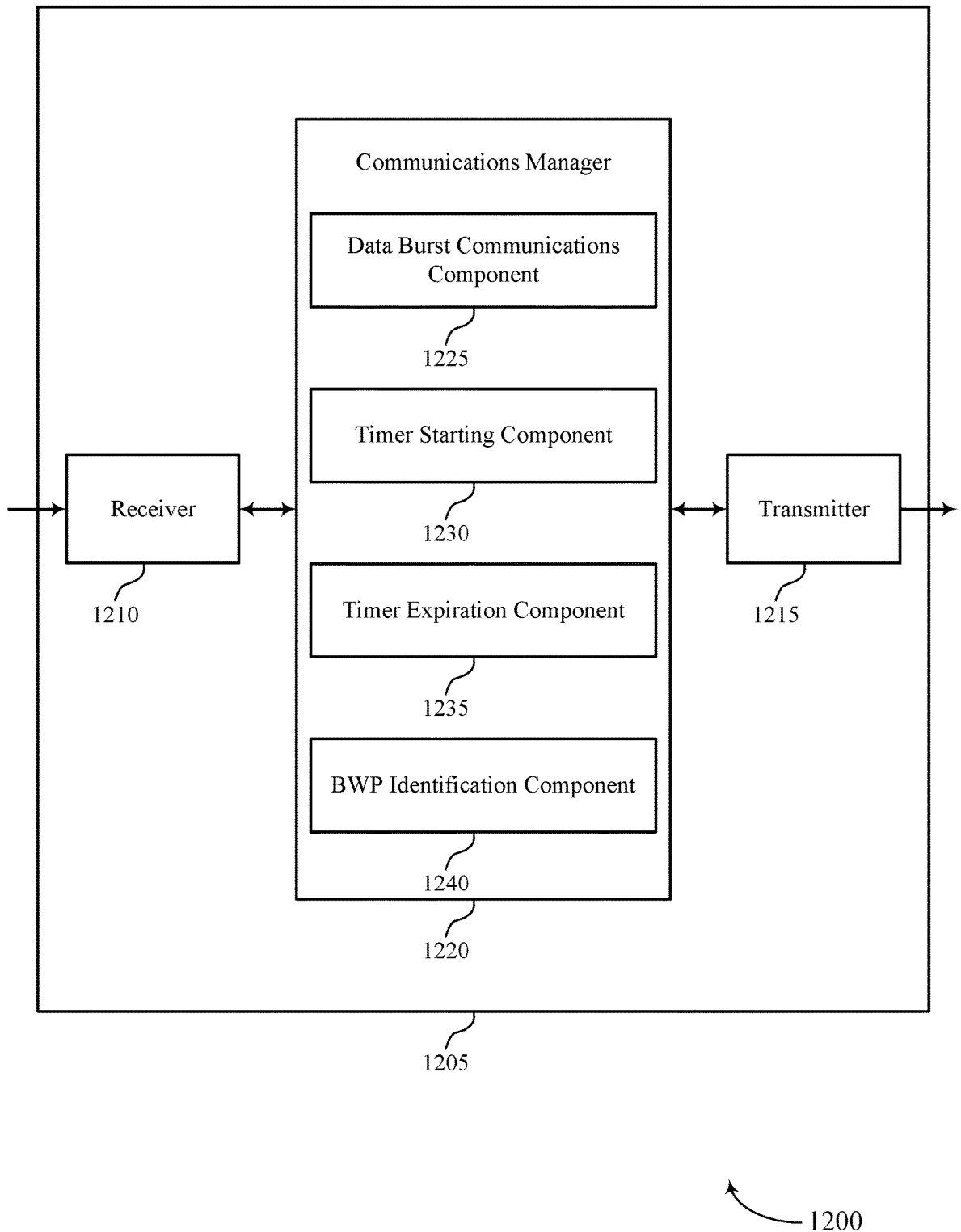

FIG. 12 shows a block diagram 1200 of a device 1205 that supports techniques for performing BWP switching in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for performing BWP switching). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for performing BWP switching). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for performing BWP switching as described herein. For example, the communications manager 1220 may include a data burst communications component 1225, a timer starting component 1230, a timer expiration component 1235, a BWP identification component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The data burst communications component 1225 may be configured as or otherwise support a means for communicating with a UE via a first instance of a periodic data burst, where the periodic data burst includes one or more uplink or downlink transmissions scheduled on a first BWP. The timer starting component 1230 may be configured as or otherwise support a means for starting a bandwidth switching timer in connection with the first instance of the periodic data burst. The timer expiration component 1235 may be configured as or otherwise support a means for determining whether the bandwidth switching timer has expired based upon an inactivity timer triggered by one or more downlink control channel messages. The BWP identification component 1240 may be configured as or otherwise support a means for identifying, based on whether the bandwidth switching timer has expired, whether the UE is operating on one of the first BWP or a second BWP during at least a portion of a time period that extends from the expiration of the inactivity timer and a second instance of the periodic data burst.

Figure 13:
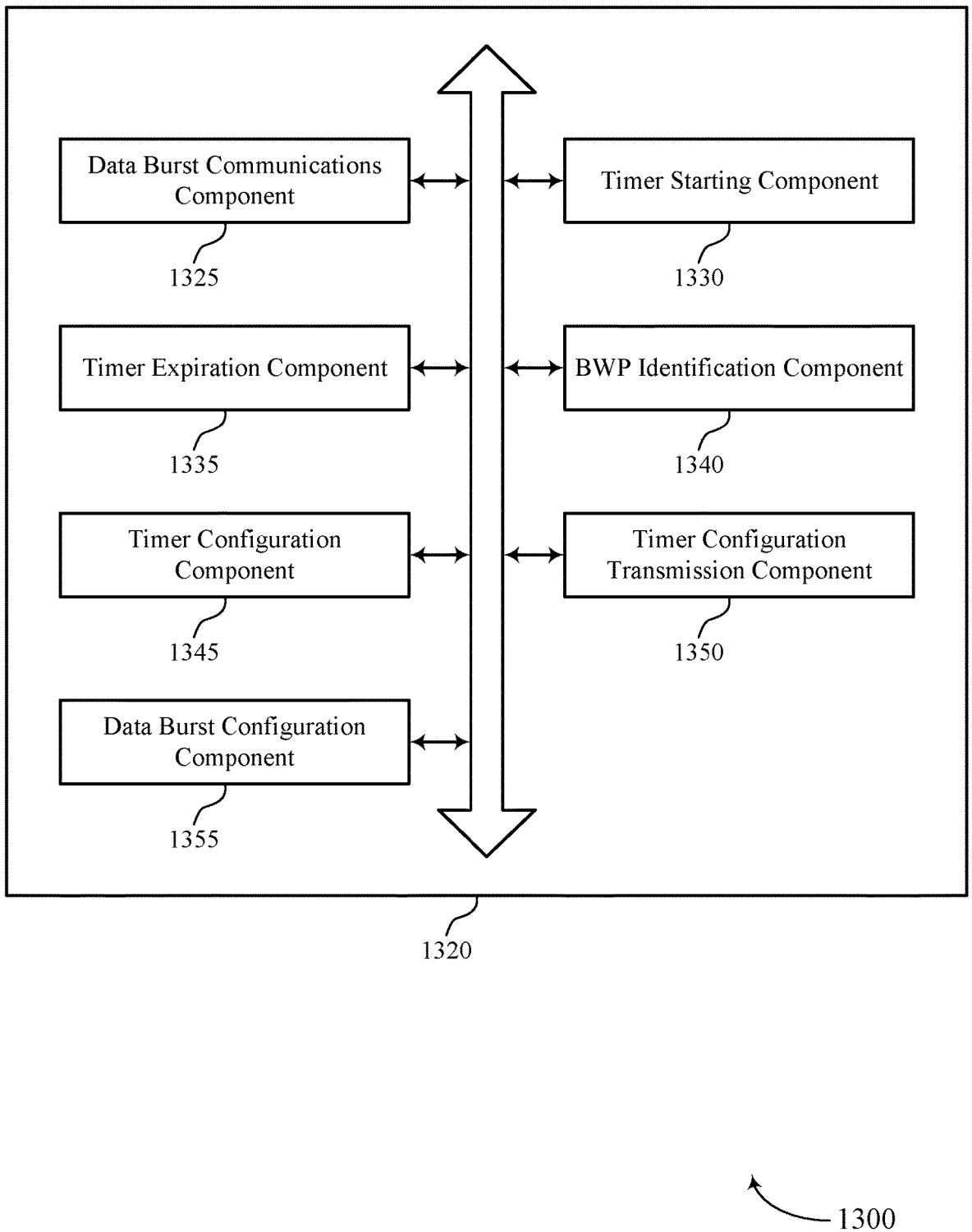
FIG. 13 shows a block diagram of a communications manager that supports techniques for performing BWP switching in accordance with aspects of the present disclosure.

FIG. 13 shows a block diagram 1300 of a communications manager 1320 that supports techniques for performing BWP switching in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for performing BWP switching as described herein. For example, the communications manager 1320 may include a data burst communications component 1325, a timer starting component 1330, a timer expiration component 1335, a BWP identification component 1340, a timer configuration component 1345, a timer configuration transmission component 1350, a data burst configuration component 1355, or any combination thereof. Each of these components may communicate, directly or indirectly, with one another (e.g., via one or more buses).

The communications manager 1320 may support wireless communications at a base station in accordance with examples as disclosed herein. The data burst communications component 1325 may be configured as or otherwise support a means for communicating with a UE via a first instance of a periodic data burst, where the periodic data burst includes one or more uplink or downlink transmissions scheduled on a first BWP. The timer starting component 1330 may be configured as or otherwise support a means for starting a bandwidth switching timer in connection with the first instance of the periodic data burst. The timer expiration component 1335 may be configured as or otherwise support a means for determining whether the bandwidth switching timer has expired based upon an inactivity timer triggered by one or more downlink control channel messages. The BWP identification component 1340 may be configured as or otherwise support a means for identifying, based on whether the bandwidth switching timer has expired, whether the UE is operating on one of the first BWP or a second BWP during at least a portion of a time period that extends from the expiration of the inactivity timer and a second instance of the periodic data burst.

In some examples, to support determining whether the bandwidth switching timer has expired, the timer expiration component 1335 may be configured as or otherwise support a means for determining that the bandwidth switching timer has expired upon the expiration of the inactivity timer. In some examples, to support determining whether the bandwidth switching timer has expired, the BWP identification component 1340 may be configured as or otherwise support a means for identifying that the UE is operating on the first BWP from at least the expiration of the inactivity timer to an expiration of the second instance of the periodic data burst.

In some examples, to support determining whether the bandwidth switching timer has expired, the timer expiration component 1335 may be configured as or otherwise support a means for determining that the bandwidth switching timer is running upon the expiration of the inactivity timer. In some examples, to support determining whether the bandwidth switching timer has expired, the BWP identification component 1340 may be configured as or otherwise support a means for identifying that the UE is operating on the second BWP during at least the portion of the time period, where at least the portion of the time period includes at least two BWP switch delays based on operating on the second BWP.

In some examples, the timer configuration component 1345 may be configured as or otherwise support a means for identifying a duration of the bandwidth switching timer for the UE. In some examples, the timer configuration transmission component 1350 may be configured as or otherwise support a means for transmitting, to the UE, an indication of the duration of the bandwidth switching timer, the indication included in a radio resource control message.

In some examples, identifying the duration of the bandwidth switching timer is based on the periodic data burst being periodic, latency sensitive, or both.

In some examples, the data burst configuration component 1355 may be configured as or otherwise support a means for transmitting an indication of a duration associated with each burst of the periodic data burst and an offset from a beginning of the duration to the beginning of the first instance, the indication included in a radio resource control message.

In some examples, the data burst configuration component 1355 may be configured as or otherwise support a means for identifying that the beginning of the first instance has started based on the duration and the offset, where starting the bandwidth switching timer is based on identifying the beginning.

In some examples, the data burst configuration component 1355 may be configured as or otherwise support a means for transmitting a MAC message, where starting the bandwidth switching timer is based on a successful transmission of the MAC message.

In some examples, the MAC message includes an indication of the beginning of the first instance, the indication included in a MAC-CE or DCI of the MAC message.

In some examples, the data burst configuration component 1355 may be configured as or otherwise support a means for identifying a beginning of the first instance. In some examples, the data burst configuration component 1355 may be configured as or otherwise support a means for transmitting a message including an instance identifier, where the message is a packet data convergence protocol message, the instance identifier being different from a previously transmitted instance identifier, where starting the bandwidth switching timer is based on the instance identifier being different from the previously transmitted instance identifier.

In some examples, the timer configuration transmission component 1350 may be configured as or otherwise support a means for transmitting an indication of a burst start timer to start at the beginning of the first instance of the periodic data burst, the indication included in a radio resource control message.

In some examples, a duration of the burst start timer is longer than a duration of the bandwidth switching timer and less than a duration of the periodic data burst.

In some examples, the bandwidth switching timer is equal to a duration of the periodic data burst minus two times a BWP switch delay.

In some examples, the first BWP is a high power BWP and the second BWP is a low power BWP.

Figure 14:
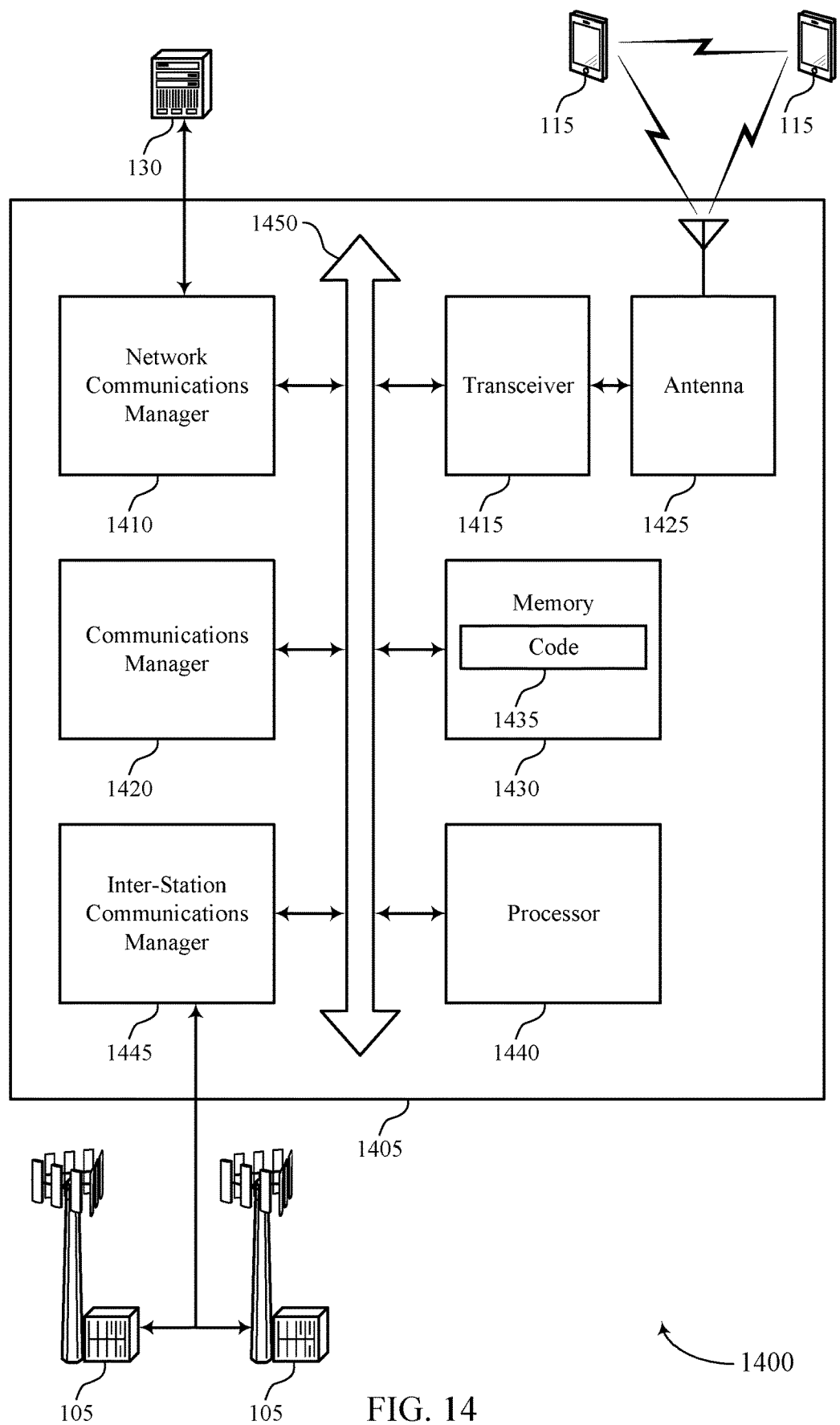
FIG. 14 shows a diagram of a system including a device that supports techniques for performing BWP switching in accordance with aspects of the present disclosure.

FIG. 14 shows a diagram of a system 1400 including a device 1405 that supports techniques for performing BWP switching in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for performing BWP switching). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for communicating with a UE via a first instance of a periodic data burst, where the periodic data burst includes one or more uplink or downlink transmissions scheduled on a first BWP. The communications manager 1420 may be configured as or otherwise support a means for starting a bandwidth switching timer in connection with the first instance of the periodic data burst. The communications manager 1420 may be configured as or otherwise support a means for determining whether the bandwidth switching timer has expired based upon an inactivity timer triggered by one or more downlink control channel messages. The communications manager 1420 may be configured as or otherwise support a means for identifying, based on whether the bandwidth switching timer has expired, whether the UE is operating on one of the first BWP or a second BWP during at least a portion of a time period that extends from the expiration of the inactivity timer and a second instance of the periodic data burst.

By including or configuring the communications manager 1420 in accordance with examples as described herein, the device 1405 may support techniques for improved communication reliability, reduced latency, reduced power consumption, improved coordination between devices, and longer battery life.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for performing BWP switching as described herein, or the processor 1440 and the memory 1430 may be otherwise configured to perform or support such operations.

Figure 15:
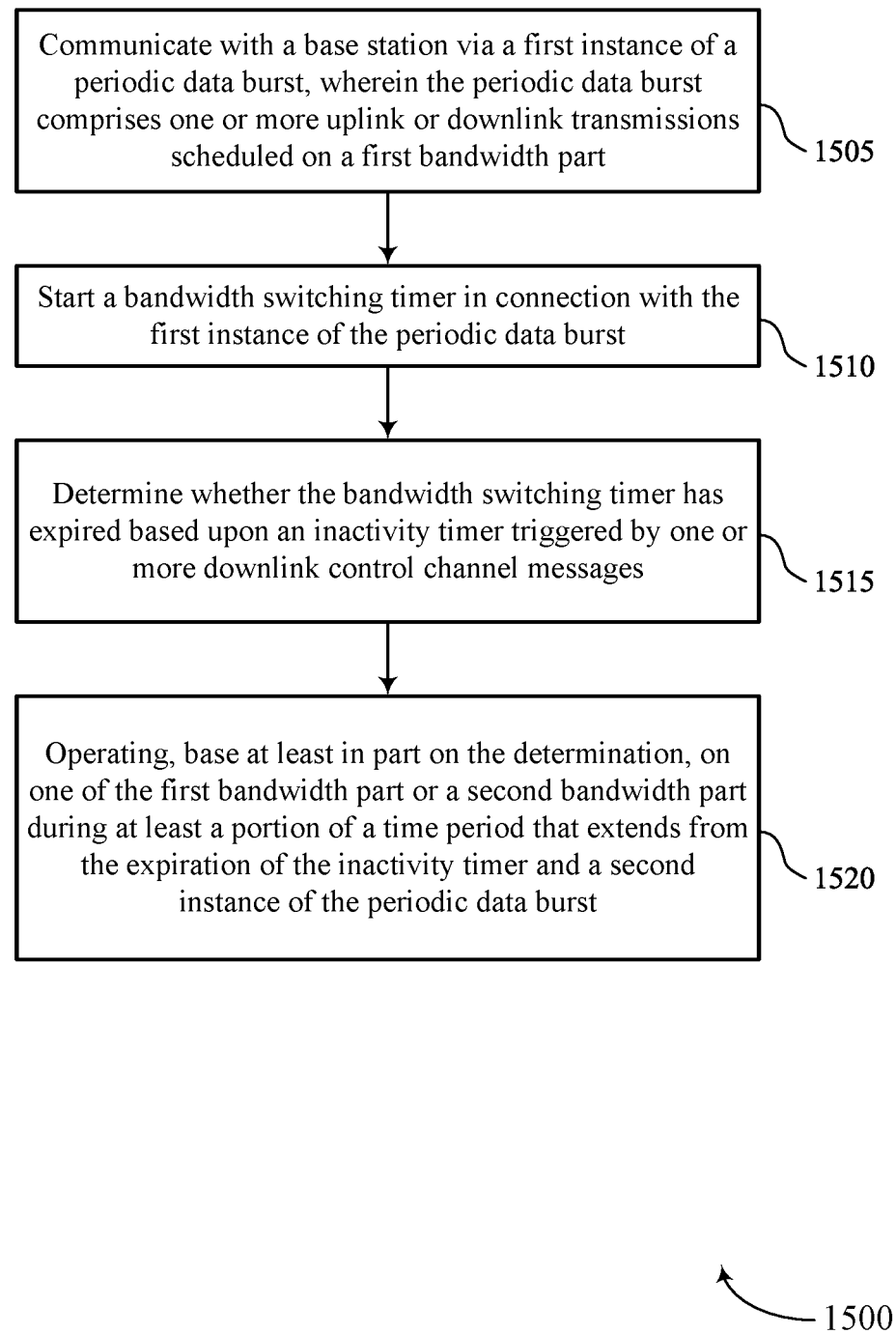
FIGS. 15 through 18 show flowcharts illustrating methods that support techniques for performing BWP switching in accordance with aspects of the present disclosure.

FIG. 15 shows a flowchart illustrating a method 1500 that supports techniques for performing BWP switching in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include communicating with a base station via a first instance of a periodic data burst, where the periodic data burst includes one or more uplink or downlink transmissions scheduled on a first BWP. The operations of 1505 may be performed in accordance with examples as disclosed herein. In some examples, aspects of the operations of 1505 may be performed by a data burst communications manager 925 as described with reference to FIG. 9.

At 1510, the method may include starting a bandwidth switching timer in connection with the first instance of the periodic data burst. The operations of 1510 may be performed in accordance with examples as disclosed herein. In some examples, aspects of the operations of 1510 may be performed by a timer starting manager 930 as described with reference to FIG. 9.

At 1515, the method may include determining whether the bandwidth switching timer has expired based upon an inactivity timer triggered by one or more downlink control channel messages. The operations of 1515 may be performed in accordance with examples as disclosed herein. In some examples, aspects of the operations of 1515 may be performed by a timer expiration manager 935 as described with reference to FIG. 9.

At 1520, the method may include operating, based on the determination, on one of the first BWP or a second BWP during at least a portion of a time period that extends from the expiration of the inactivity timer and a second instance of the periodic data burst. The operations of 1520 may be performed in accordance with examples as disclosed herein. In some examples, aspects of the operations of 1520 may be performed by a BWP operations manager 940 as described with reference to FIG. 9.

Figure 16:
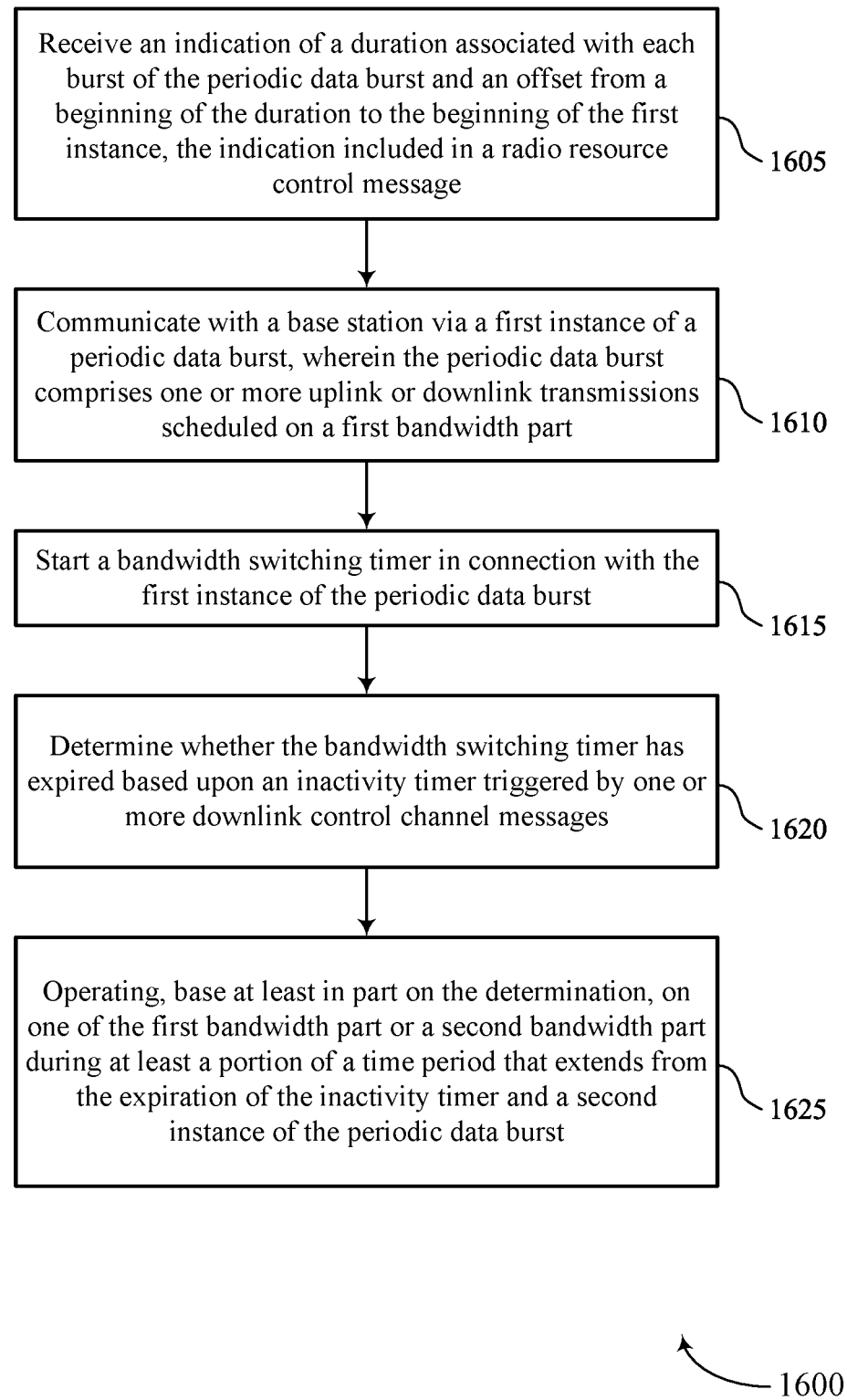

FIG. 16 shows a flowchart illustrating a method 1600 that supports techniques for performing BWP switching in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving an indication of a duration associated with each burst of the periodic data burst and an offset from a beginning of the duration to the beginning of the first instance, the indication included in a radio resource control message. The operations of 1605 may be performed in accordance with examples as disclosed herein. In some examples, aspects of the operations of 1605 may be performed by a data burst configuration manager 950 as described with reference to FIG. 9.

At 1610, the method may include communicating with a base station via a first instance of a periodic data burst, where the periodic data burst includes one or more uplink or downlink transmissions scheduled on a first BWP. The operations of 1610 may be performed in accordance with examples as disclosed herein. In some examples, aspects of the operations of 1610 may be performed by a data burst communications manager 925 as described with reference to FIG. 9.

At 1615, the method may include starting a bandwidth switching timer in connection with the first instance of the periodic data burst. The operations of 1615 may be performed in accordance with examples as disclosed herein. In some examples, aspects of the operations of 1615 may be performed by a timer starting manager 930 as described with reference to FIG. 9.

At 1620, the method may include determining whether the bandwidth switching timer has expired based upon an inactivity timer triggered by one or more downlink control channel messages. The operations of 1620 may be performed in accordance with examples as disclosed herein. In some examples, aspects of the operations of 1620 may be performed by a timer expiration manager 935 as described with reference to FIG. 9.

At 1625, the method may include operating, based on the determination, on one of the first BWP or a second BWP during at least a portion of a time period that extends from the expiration of the inactivity timer and a second instance of the periodic data burst. The operations of 1625 may be performed in accordance with examples as disclosed herein. In some examples, aspects of the operations of 1625 may be performed by a BWP operations manager 940 as described with reference to FIG. 9.

Figure 17:
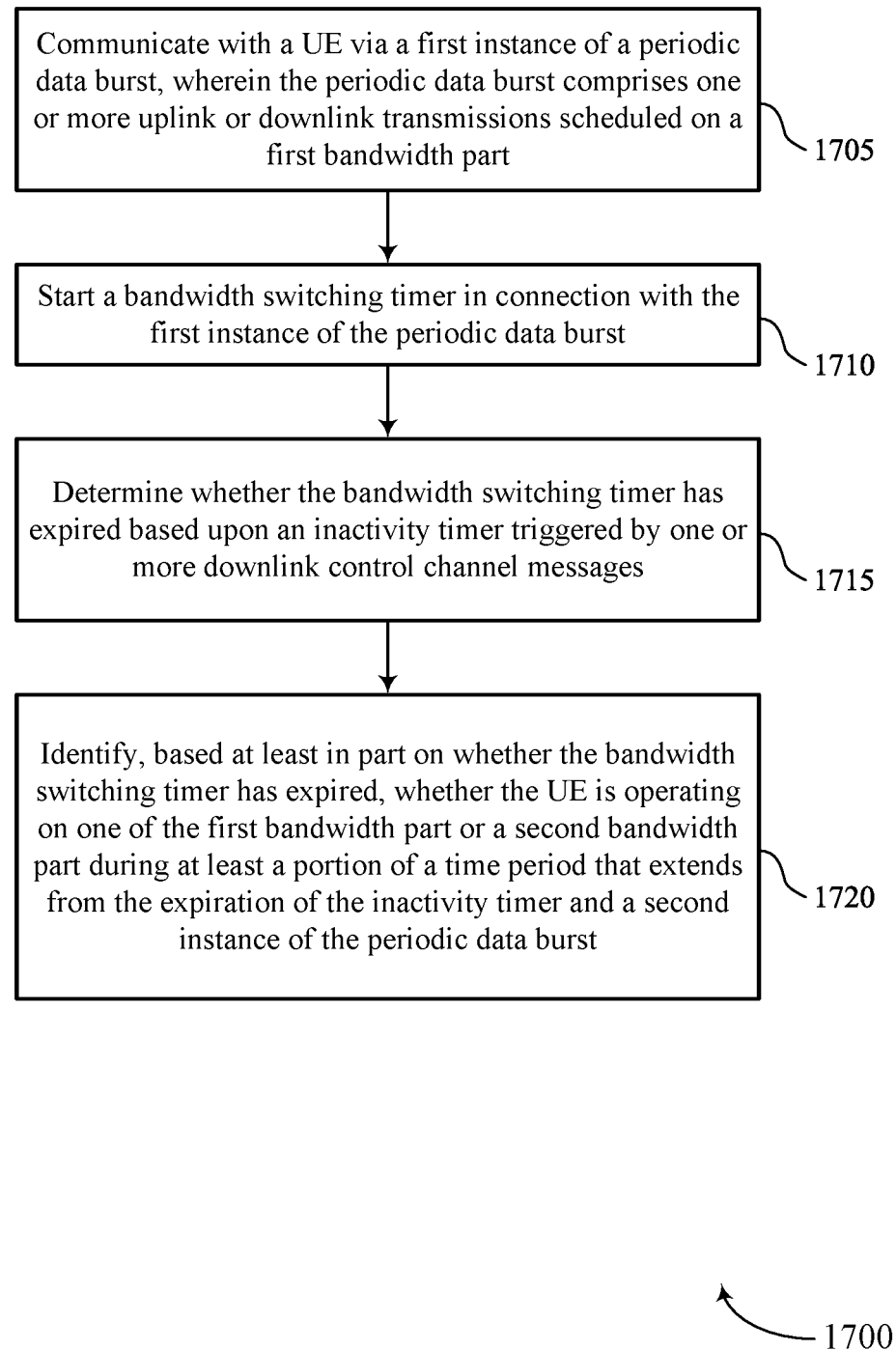

FIG. 17 shows a flowchart illustrating a method 1700 that supports techniques for performing BWP switching in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include communicating with a UE via a first instance of a periodic data burst, where the periodic data burst includes one or more uplink or downlink transmissions scheduled on a first BWP. The operations of 1705 may be performed in accordance with examples as disclosed herein. In some examples, aspects of the operations of 1705 may be performed by a data burst communications component 1325 as described with reference to FIG. 13.

At 1710, the method may include starting a bandwidth switching timer in connection with the first instance of the periodic data burst. The operations of 1710 may be performed in accordance with examples as disclosed herein. In some examples, aspects of the operations of 1710 may be performed by a timer starting component 1330 as described with reference to FIG. 13.

At 1715, the method may include determining whether the bandwidth switching timer has expired based upon an inactivity timer triggered by one or more downlink control channel messages. The operations of 1715 may be performed in accordance with examples as disclosed herein. In some examples, aspects of the operations of 1715 may be performed by a timer expiration component 1335 as described with reference to FIG. 13.

At 1720, the method may include identifying, based on whether the bandwidth switching timer has expired, whether the UE is operating on one of the first BWP or a second BWP during at least a portion of a time period that extends from the expiration of the inactivity timer and a second instance of the periodic data burst. The operations of 1720 may be performed in accordance with examples as disclosed herein. In some examples, aspects of the operations of 1720 may be performed by a BWP identification component 1340 as described with reference to FIG. 13.

Figure 18:
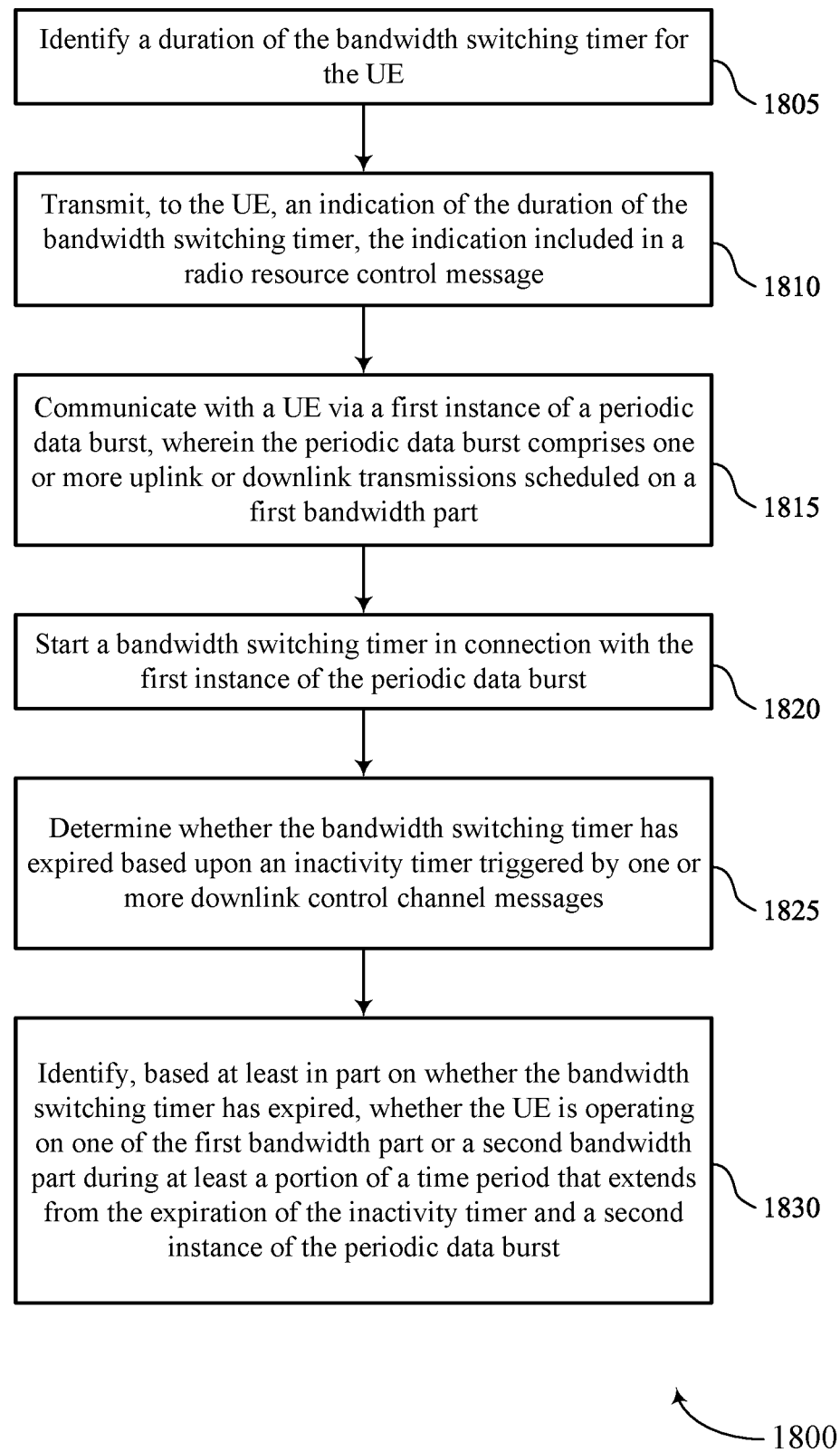

FIG. 18 shows a flowchart illustrating a method 1800 that supports techniques for performing BWP switching in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include identifying a duration of the bandwidth switching timer for the UE. The operations of 1805 may be performed in accordance with examples as disclosed herein. In some examples, aspects of the operations of 1805 may be performed by a timer configuration component 1345 as described with reference to FIG. 13.

At 1810, the method may include transmitting, to the UE, an indication of the duration of the bandwidth switching timer, the indication included in a radio resource control message. The operations of 1810 may be performed in accordance with examples as disclosed herein. In some examples, aspects of the operations of 1810 may be performed by a timer configuration transmission component 1350 as described with reference to FIG. 13.

At 1815, the method may include communicating with a UE via a first instance of a periodic data burst, where the periodic data burst includes one or more uplink or downlink transmissions scheduled on a first BWP. The operations of 1815 may be performed in accordance with examples as disclosed herein. In some examples, aspects of the operations of 1815 may be performed by a data burst communications component 1325 as described with reference to FIG. 13.

At 1820, the method may include starting a bandwidth switching timer in connection with the first instance of the periodic data burst. The operations of 1820 may be performed in accordance with examples as disclosed herein. In some examples, aspects of the operations of 1820 may be performed by a timer starting component 1330 as described with reference to FIG. 13.

At 1825, the method may include determining whether the bandwidth switching timer has expired based upon an inactivity timer triggered by one or more downlink control channel messages. The operations of 1825 may be performed in accordance with examples as disclosed herein. In some examples, aspects of the operations of 1825 may be performed by a timer expiration component 1335 as described with reference to FIG. 13.

At 1830, the method may include identifying, based on whether the bandwidth switching timer has expired, whether the UE is operating on one of the first BWP or a second BWP during at least a portion of a time period that extends from the expiration of the inactivity timer and a second instance of the periodic data burst. The operations of 1830 may be performed in accordance with examples as disclosed herein. In some examples, aspects of the operations of 1830 may be performed by a BWP identification component 1340 as described with reference to FIG. 13.

The following provides an overview of aspects of the present disclosure:

Aspect 1: A method for wireless communications at a UE, comprising: communicating with a base station via a first instance of a periodic data burst, wherein the periodic data burst comprises one or more uplink or downlink transmissions scheduled on a first bandwidth part; starting a bandwidth switching timer in connection with the first instance of the periodic data burst; determining whether the bandwidth switching timer has expired based upon an inactivity timer triggered by one or more downlink control channel messages s; and operating, based at least in part on the determination, on one of the first bandwidth part or a second bandwidth part during at least a portion of a time period that extends from the expiration of the inactivity timer and a second instance of the periodic data burst.

Aspect 2: The method of aspect 1, wherein determining whether the bandwidth switching timer has expired further comprises: determining that the bandwidth switching timer has expired upon the expiration of the inactivity timer; and remaining on the first bandwidth part from at least the expiration of the inactivity timer to an expiration of the second instance of the periodic data burst.

Aspect 3: The method of any of aspects 1 through 2, wherein determining whether the bandwidth switching timer has expired further comprises: determining that the bandwidth switching timer is running upon the expiration of the inactivity timer; and operating on the second bandwidth part during at least the portion of the time period, wherein at least the portion of the time period comprises at least two bandwidth part switch delays based at least in part on operating on the second bandwidth part.

Aspect 4: The method of aspect 3, further comprising: operating in accordance with a first switch delay portion upon the expiration of the inactivity timer; operating on the second bandwidth part upon completion of the first switch delay portion; operating in accordance with a second switch delay portion based at least in part on receiving a downlink control message while operating in the second bandwidth part; and operating on the first bandwidth part upon completion of the second switch delay portion, wherein the beginning of the second instance of the periodic data burst starts based at least in part on operating on the first bandwidth part.

Aspect 5: The method of any of aspects 1 through 4, further comprising: receiving an indication of a duration of the bandwidth switching timer, the indication included in a radio resource control message.

Aspect 6: The method of any of aspects 1 through 5, further comprising: receiving an indication of a duration associated with each burst of the periodic data burst and an offset from a beginning of the duration to the beginning of the first instance, the indication included in a radio resource control message.

Aspect 7: The method of aspect 6, further comprising: identifying that the beginning of the first instance has started based at least in part on the duration and the offset, wherein starting the bandwidth switching timer is based at least in part on identifying the beginning.

Aspect 8: The method of any of aspects 1 through 7, further comprising: receiving a message indicating the beginning of the first instance, wherein starting the bandwidth switching timer is based at least in part on the message.

Aspect 9: The method of aspect 8, wherein receiving the message further comprises: receiving a medium access control (MAC) message comprising an indication of the beginning of the first instance, wherein the indication is included in a MAC control element or downlink control information of the MAC message.

Aspect 10: The method of any of aspects 1 through 9, further comprising: receiving a message comprising an instance identifier, wherein the message is a packet data convergence protocol message; and determining whether the instance identifier is different from a previously received instance identifier; and determining whether to start the bandwidth switching timer based at least in part on whether the instance identifier is different from the previously received instance identifier.

Aspect 11: The method of aspect 10, wherein determining whether the instance identifier is different further comprises: determining that the instance identifier is different from the previously received instance identifier, wherein starting the bandwidth switching timer is based at least in part on the instance identifier being different from the previously received instance identifier.

Aspect 12: The method of any of aspects 1 through 11, further comprising: receiving a medium access control (MAC) message associated with the periodic data burst; and identifying whether the bandwidth switching timer is running based at least in part on receiving the MAC message, wherein starting the bandwidth switching timer is based on identifying that the bandwidth switching timer was not already running.

Aspect 13: The method of any of aspects 1 through 12, further comprising: receiving an indication of a burst start timer to start at the beginning of the first instance of the periodic data burst.

Aspect 14: The method of aspect 13, further comprising: receiving a medium access control (MAC) message associated with the periodic data burst; identifying whether the burst start timer is running based at least in part on receiving the MAC message; and determining whether to start the burst start timer and the bandwidth switching timer based at least in part on whether the burst start timer is running.

Aspect 15: The method of aspect 14, further comprising: starting the burst start timer and the bandwidth switching timer based at least in part on identifying that the burst start timer is not running.

Aspect 16: The method of any of aspects 13 through 15, further comprising: receiving a message indicating a duration of the burst start timer, the duration included in a radio resource control message.

Aspect 17: The method of any of aspects 13 through 16, wherein a duration of the burst start timer is longer than a duration of the bandwidth switching timer and less than a duration of the periodic data burst.

Aspect 18: The method of any of aspects 1 through 17, further comprising: identifying the expiration of the inactivity timer; and stopping the bandwidth switching timer based at least in part on identifying the expiration of the inactivity timer.

Aspect 19: The method of any of aspects 1 through 18, wherein the bandwidth switching timer is equal to a duration of the periodic data burst minus two times a bandwidth part switch delay.

Aspect 20: The method of any of aspects 1 through 19, wherein the first bandwidth part is a high power bandwidth part and the second bandwidth part is a low power bandwidth part.

Aspect 21: A method for wireless communications at a base station, comprising: communicating with a UE via a first instance of a periodic data burst, wherein the periodic data burst comprises one or more uplink or downlink transmissions scheduled on a first bandwidth part; starting a bandwidth switching timer in connection with the first instance of the periodic data burst; determining whether the bandwidth switching timer has expired based upon an inactivity timer triggered by one or more downlink control channel messages; and identifying, based at least in part on whether the bandwidth switching timer has expired, whether the UE is operating on one of the first bandwidth part or a second bandwidth part during at least a portion of a time period that extends from the expiration of the inactivity timer and a second instance of the periodic data burst.

Aspect 22: The method of aspect 21, wherein determining whether the bandwidth switching timer has expired further comprises: determining that the bandwidth switching timer has expired upon the expiration of the inactivity timer; and identifying that the UE is operating on the first bandwidth part from at least the expiration of the inactivity timer to an expiration of the second instance of the periodic data burst.

Aspect 23: The method of any of aspects 21 through 22, wherein determining whether the bandwidth switching timer has expired further comprises: determining that the bandwidth switching timer is running upon the expiration of the inactivity timer; and identifying that the UE is operating on the second bandwidth part during at least the portion of the time period, wherein at least the portion of the time period comprises at least two bandwidth part switch delays based at least in part on operating on the second bandwidth part.

Aspect 24: The method of any of aspects 21 through 23, further comprising: identifying a duration of the bandwidth switching timer for the UE; and transmitting, to the UE, an indication of the duration of the bandwidth switching timer, the indication included in a radio resource control message.

Aspect 25: The method of aspect 24, wherein identifying the duration of the bandwidth switching timer is based at least in part on the periodic data burst being periodic, latency sensitive, or both.

Aspect 26: The method of any of aspects 21 through 25, further comprising: transmitting an indication of a duration associated with each burst of the periodic data burst and an offset from a beginning of the duration to the beginning of the first instance, the indication included in a radio resource control message.

Aspect 27: The method of aspect 26, further comprising: identifying that the beginning of the first instance has started based at least in part on the duration and the offset, wherein starting the bandwidth switching timer is based at least in part on identifying the beginning.

Aspect 28: The method of any of aspects 21 through 27, further comprising: transmitting a medium access control (MAC) message, wherein starting the bandwidth switching timer is based at least in part on a successful transmission of the MAC message.

Aspect 29: The method of aspect 28, wherein the MAC message comprises an indication of the beginning of the first instance, the indication included in a MAC control element or downlink control information of the MAC message.

Aspect 30: The method of any of aspects 21 through 29, further comprising: identifying a beginning of the first instance; transmitting a message comprising an instance identifier, wherein the message is a packet data convergence protocol message, the instance identifier being different from a previously transmitted instance identifier, wherein starting the bandwidth switching timer is based at least in part on the instance identifier being different from the previously transmitted instance identifier.

Aspect 31: The method of any of aspects 21 through 30, further comprising: transmitting an indication of a burst start timer to start at the beginning of the first instance of the periodic data burst, the indication included in a radio resource control message.

Aspect 32: The method of aspect 31, wherein a duration of the burst start timer is longer than a duration of the bandwidth switching timer and less than a duration of the periodic data burst.

Aspect 33: The method of any of aspects 21 through 32, wherein the bandwidth switching timer is equal to a duration of the periodic data burst minus two times a bandwidth part switch delay.

Aspect 34: The method of any of aspects 21 through 33, wherein the first bandwidth part is a high power bandwidth part and the second bandwidth part is a low power bandwidth part.

Aspect 35: An apparatus for wireless communications, comprising a processor; memory coupled with the processor; and instructions stored in the memory and executable by the processor to cause the apparatus to perform a method of any of aspects 1 through 20.

Aspect 36: An apparatus for wireless communications, comprising at least one means for performing a method of any of aspects 1 through 20.

Aspect 37: A non-transitory computer-readable medium storing code for wireless communications, the code comprising instructions executable by a processor to perform a method of any of aspects 1 through 20.

Aspect 38: An apparatus for wireless communications, comprising a processor; memory coupled with the processor; and instructions stored in the memory and executable by the processor to cause the apparatus to perform a method of any of aspects 21 through 34.

Aspect 39: An apparatus for wireless communications, comprising at least one means for performing a method of any of aspects 21 through 34.

Aspect 40: A non-transitory computer-readable medium storing code for wireless communications, the code comprising instructions executable by a processor to perform a method of any of aspects 21 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    communicating with a network device via a first instance of a periodic data burst, wherein the periodic data burst comprises one or more uplink or downlink transmissions scheduled on a first bandwidth part;
    starting a bandwidth switching timer in connection with the first instance of the periodic data burst;
    determining whether the bandwidth switching timer has expired based upon expiration of an inactivity timer triggered by one or more downlink control channel messages, wherein the inactivity timer is different from the bandwidth switching timer; and
    operating, based at least in part on the determination, on one of the first bandwidth part or a second bandwidth part during at least a portion of a time period that extends from the expiration of the inactivity timer and a second instance of the periodic data burst.

2. The method of claim 1, wherein determining whether the bandwidth switching timer has expired further comprises:
    determining that the bandwidth switching timer has expired upon the expiration of the inactivity timer; and
    remaining on the first bandwidth part from at least the expiration of the inactivity timer to an expiration of the second instance of the periodic data burst.

3. The method of claim 1, wherein determining whether the bandwidth switching timer has expired further comprises:
    determining that the bandwidth switching timer is running upon the expiration of the inactivity timer; and
    operating on the second bandwidth part during at least the portion of the time period, wherein at least the portion of the time period comprises at least two bandwidth part switch delays based at least in part on operating on the second bandwidth part.

4. The method of claim 3, further comprising:
operating in accordance with a first switch delay portion upon the expiration of the inactivity timer;
operating on the second bandwidth part upon completion of the first switch delay portion;
operating in accordance with a second switch delay portion based at least in part on receiving a downlink control message while operating in the second bandwidth part; and
operating on the first bandwidth part upon completion of the second switch delay portion, wherein a beginning of the second instance of the periodic data burst starts based at least in part on operating on the first bandwidth part.

5. The method of claim 1, further comprising:
receiving an indication of a duration of the bandwidth switching timer, the indication included in a radio resource control message.

6. The method of claim 1, further comprising:
receiving an indication of a duration associated with each burst of the periodic data burst and an offset from a beginning of the duration to the beginning of the first instance, the indication included in a radio resource control message.

7. The method of claim 6, further comprising:
identifying that the beginning of the first instance has started based at least in part on the duration and the offset, wherein starting the bandwidth switching timer is based at least in part on identifying the beginning.

8. The method of claim 1, further comprising:
receiving a message indicating a beginning of the first instance, wherein starting the bandwidth switching timer is based at least in part on the message.

9. The method of claim 8, wherein receiving the message further comprises:
receiving a medium access control (MAC) message comprising an indication of the beginning of the first instance, wherein the indication is included in a MAC control element or downlink control information of the MAC message.

10. The method of claim 1, further comprising:
receiving a message comprising an instance identifier, wherein the message is a packet data convergence protocol message; and
determining whether the instance identifier is different from a previously received instance identifier; and
determining whether to start the bandwidth switching timer based at least in part on whether the instance identifier is different from the previously received instance identifier.

11. The method of claim 10, wherein determining whether the instance identifier is different further comprises:
determining that the instance identifier is different from the previously received instance identifier, wherein starting the bandwidth switching timer is based at least in part on the instance identifier being different from the previously received instance identifier.

12. The method of claim 1, further comprising:
receiving a medium access control (MAC) message associated with the periodic data burst; and
identifying whether the bandwidth switching timer is running based at least in part on receiving the MAC message, wherein starting the bandwidth switching timer is based on identifying that the bandwidth switching timer was not already running.

13. The method of claim 1, further comprising:
receiving an indication of a burst start timer to start at a beginning of the first instance of the periodic data burst.

14. The method of claim 13, further comprising:
receiving a medium access control (MAC) message associated with the periodic data burst;
identifying whether the burst start timer is running based at least in part on receiving the MAC message; and
determining whether to start the burst start timer and the bandwidth switching timer based at least in part on whether the burst start timer is running.

15. The method of claim 14, further comprising:
starting the burst start timer and the bandwidth switching timer based at least in part on identifying that the burst start timer is not running.

16. The method of claim 13, further comprising:
receiving a message indicating a duration of the burst start timer, the duration included in a radio resource control message.

17. The method of claim 1, further comprising:
identifying the expiration of the inactivity timer; and
stopping the bandwidth switching timer based at least in part on identifying the expiration of the inactivity timer.

18. The method of claim 1, wherein the bandwidth switching timer is equal to a duration of the periodic data burst minus two times a bandwidth part switch delay.

19. A method for wireless communications at a network device, comprising:
communicating with a user equipment (UE) via a first instance of a periodic data burst, wherein the periodic data burst comprises one or more uplink or downlink transmissions scheduled on a first bandwidth part;
starting a bandwidth switching timer in connection with the first instance of the periodic data burst;
determining whether the bandwidth switching timer has expired based upon expiration of an inactivity timer triggered by one or more downlink control channel messages, wherein the inactivity timer is different from the bandwidth switching timer; and
identifying, based at least in part on whether the bandwidth switching timer has expired, whether the UE is operating on one of the first bandwidth part or a second bandwidth part during at least a portion of a time period that extends from the expiration of the inactivity timer and a second instance of the periodic data burst.

20. The method of claim 19, wherein determining whether the bandwidth switching timer has expired further comprises:
determining that the bandwidth switching timer has expired upon the expiration of the inactivity timer; and
identifying that the UE is operating on the first bandwidth part from at least the expiration of the inactivity timer to an expiration of the second instance of the periodic data burst.

21. The method of claim 19, wherein determining whether the bandwidth switching timer has expired further comprises:
determining that the bandwidth switching timer is running upon the expiration of the inactivity timer; and
identifying that the UE is operating on the second bandwidth part during at least the portion of the time period, wherein at least the portion of the time period comprises at least two bandwidth part switch delays based at least in part on operating on the second bandwidth part.

22. The method of claim 19, further comprising:
identifying a duration of the bandwidth switching timer for the UE; and
transmitting, to the UE, an indication of the duration of the bandwidth switching timer, the indication included in a radio resource control message.

23. The method of claim 22, wherein identifying the duration of the bandwidth switching timer is based at least in part on the periodic data burst being periodic, latency sensitive, or both.

24. The method of claim 19, further comprising:
transmitting an indication of a duration associated with each burst of the periodic data burst and an offset from a beginning of the duration to the beginning of the first instance, the indication included in a radio resource control message.

25. The method of claim 24, further comprising:
identifying that the beginning of the first instance has started based at least in part on the duration and the offset, wherein starting the bandwidth switching timer is based at least in part on identifying the beginning.

26. The method of claim 19, further comprising:
transmitting a medium access control (MAC) message, wherein starting the bandwidth switching timer is based at least in part on a successful transmission of the MAC message.

27. The method of claim 26, wherein the MAC message comprises an indication of a beginning of the first instance, the indication included in a MAC control element or downlink control information of the MAC message.

28. The method of claim 19, further comprising:
identifying a beginning of the first instance; and
transmitting a message comprising an instance identifier, wherein the message is a packet data convergence protocol message, the instance identifier being different from a previously transmitted instance identifier, wherein starting the bandwidth switching timer is based at least in part on the instance identifier being different from the previously transmitted instance identifier.

29. An apparatus for wireless communications, comprising:
a processor;
memory coupled with the processor; and
instructions stored in the memory and executable by the processor to cause the apparatus to:
communicate with a network device via a first instance of a periodic data burst, wherein the periodic data burst comprises one or more uplink or downlink transmissions scheduled on a first bandwidth part;
start a bandwidth switching timer in connection with the first instance of the periodic data burst;
determine whether the bandwidth switching timer has expired based upon expiration of an inactivity timer triggered by one or more downlink control channel messages, wherein the inactivity timer is different from the bandwidth switching timer; and
operating, based at least in part on the determination, on one of the first bandwidth part or a second bandwidth part during at least a portion of a time period that extends from the expiration of the inactivity timer and a second instance of the periodic data burst.

30. An apparatus for wireless communications, comprising:
a processor;
memory coupled with the processor; and
instructions stored in the memory and executable by the processor to cause the apparatus to:
communicate with a user equipment (UE) via a first instance of a periodic data burst, wherein the periodic data burst comprises one or more uplink or downlink transmissions scheduled on a first bandwidth part;
start a bandwidth switching timer in connection with the first instance of the periodic data burst;
determine whether the bandwidth switching timer has expired based upon expiration of an inactivity timer triggered by one or more downlink control channel messages, wherein the inactivity timer is different from the bandwidth switching timer; and
identify, based at least in part on whether the bandwidth switching timer has expired, whether the UE is operating on one of the first bandwidth part or a second bandwidth part during at least a portion of a time period that extends from the expiration of the inactivity timer and a second instance of the periodic data burst.

* * * * *